US011082703B2

(12) United States Patent
Seregin et al.

(10) Patent No.: US 11,082,703 B2
(45) Date of Patent: *Aug. 3, 2021

(54) NEIGHBOR BASED SIGNALING OF INTRA PREDICTION MODES

(71) Applicant: QUALCOMM Incorporated, San Diego, CA (US)

(72) Inventors: Vadim Seregin, San Diego, CA (US); Xin Zhao, Santa Clara, CA (US); Amir Said, San Diego, CA (US); Marta Karczewicz, San Diego, CA (US); Nan Hu, San Diego, CA (US); Wei-Jung Chien, San Diego, CA (US); Vijayaraghavan Thirumalai, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,756

(22) Filed: Dec. 16, 2019

(65) Prior Publication Data
US 2020/0195935 A1 Jun. 18, 2020

Related U.S. Application Data

(63) Continuation of application No. 15/590,261, filed on May 9, 2017, now Pat. No. 10,547,854.
(Continued)

(51) Int. Cl.
H04N 19/11 (2014.01)
H04N 19/159 (2014.01)
H04N 19/463 (2014.01)
H04N 19/176 (2014.01)
(Continued)

(52) U.S. Cl.
CPC ........... H04N 19/159 (2014.11); H04N 1/417 (2013.01); H04N 5/9262 (2013.01);
(Continued)

(58) Field of Classification Search
CPC ..... H04N 19/159; H04N 9/8045; H04N 1/417
See application file for complete search history.

(56) References Cited

U.S. PATENT DOCUMENTS 8,923,395 B2 12/2014 Wang et al.
9,154,796 B2 10/2015 Seregin et al.
(Continued)

FOREIGN PATENT DOCUMENTS

CN 101605255 A 12/2009
CN 102685474 A 9/2012
(Continued)

OTHER PUBLICATIONS

Seregin V., et al., "Block Shape Dependent Intra Mode Coding", 4 JVET Meeting, Chengdu, (The Joint Video Exploration Team of ISO/IEC JTC1/SC29/WG11 and ITU-T SG.16), URL: http://phenix.int-evry.fr/jvet/, No. JVET-D0114, 15-21, Oct. 2016, XP030150361, Oct. 6, 2016 (Oct. 6, 2016), 3 pages.
(Continued)

Primary Examiner — Tsion B Owens
(74) Attorney, Agent, or Firm — Shumaker & Sieffert, P.A.

(57) ABSTRACT

A device for coding video data is configured to determine that a current block of video data is coded using an intra prediction mode; add an intra prediction mode of a first neighboring block of the current block to a most probable mode candidate list for the current block; add an intra prediction mode for a second neighboring block of the current block to the most probable mode candidate list for the current block; add an intra prediction mode for a third neighboring block of the current block to the most probable mode candidate list for the current block; and code the current block of video data using an intra prediction mode.

25 Claims, 13 Drawing Sheets

Related U.S. Application Data

(60) Provisional application No. 62/336,414, filed on May 13, 2016, provisional application No. 62/404,128, filed on Oct. 4, 2016.

(51) Int. Cl.
| | |
|---|---|
| *H04N 19/91* | (2014.01) |
| *H04N 19/157* | (2014.01) |
| *H04N 19/593* | (2014.01) |
| *H04N 1/417* | (2006.01) |
| *H04N 5/926* | (2006.01) |
| *H04N 9/804* | (2006.01) |
| *H04N 9/808* | (2006.01) |

(52) U.S. Cl.
CPC ......... *H04N 9/8045* (2013.01); *H04N 9/8082* (2013.01); *H04N 19/11* (2014.11); *H04N 19/157* (2014.11); *H04N 19/176* (2014.11); *H04N 19/463* (2014.11); *H04N 19/593* (2014.11); *H04N 19/91* (2014.11)

(56) References Cited

U.S. PATENT DOCUMENTS

| | | | |
|---|---|---|---|
| 9,344,728 | B2 | 5/2016 | Oh et al. |
| 10,506,228 | B2 | 12/2019 | Seregin et al. |
| 10,547,854 | B2 | 1/2020 | Seregin et al. |
| 2012/0177113 | A1 | 7/2012 | Guo et al. |
| 2012/0314766 | A1* | 12/2012 | Chien ............ H04N 19/11 375/240.12 |
| 2013/0064296 | A1* | 3/2013 | Sun ............... H04N 19/60 375/240.12 |
| 2013/0163664 | A1 | 6/2013 | Guo et al. |
| 2013/0215963 | A1 | 8/2013 | Yie et al. |
| 2014/0133558 | A1* | 5/2014 | Seregin ........... H04N 19/593 375/240.12 |
| 2014/0205006 | A1* | 7/2014 | Jeong ............. H04N 19/11 375/240.03 |
| 2015/0208090 | A1 | 7/2015 | Sakakibara et al. |
| 2016/0044310 | A1* | 2/2016 | Park ............... H04N 19/176 375/240.12 |
| 2016/0219290 | A1 | 7/2016 | Zhao et al. |
| 2017/0094285 | A1 | 3/2017 | Said et al. |
| 2017/0094313 | A1 | 3/2017 | Zhao et al. |
| 2017/0094314 | A1 | 3/2017 | Zhao et al. |
| 2020/0068194 | A1 | 2/2020 | Seregin et al. |

FOREIGN PATENT DOCUMENTS

| | | |
|---|---|---|
| CN | 102918844 A | 2/2013 |
| CN | 103229507 A | 7/2013 |
| CN | 103262542 A | 8/2013 |
| CN | 103299622 A | 9/2013 |
| CN | 103765892 A | 4/2014 |
| CN | 103959789 A | 7/2014 |
| EP | 2635030 A2 | 9/2013 |
| EP | 2728883 A2 | 5/2014 |
| JP | 2012147268 A | 8/2012 |
| JP | 2013541303 A | 11/2013 |
| JP | 2014523697 A | 9/2014 |
| WO | WO-2012044840 A1 | 4/2012 |
| WO | WO-2012119569 A1 | 9/2012 |
| WO | 2012167119 A1 | 12/2012 |
| WO | WO-2012171463 A1 | 12/2012 |
| WO | WO-2013067334 A2 | 5/2013 |
| WO | WO-2014054267 A1 | 4/2014 |

OTHER PUBLICATIONS

Bossen F., et al., "HM Software Manual," Joint Collaborative Team on Video Coding (JCT-VC) of ITU-T SG16 WP3 and ISO/IEC JTC1/SC29/WG11, Document: JCTVC—Software Manual, Retrieved on Jun. 18, 2015, pp. 1-27.

Chen J., et al., "Algorithm Description of Joint Exploration Test Model 2 (JEM2)," 114 MPEG Meeting, Feb. 22, 2016-Feb. 26, 2016; (Motion Picture Expert Group or ISO/IEC/JTC1/SC29/WG11), No. N16066, Apr. 4, 2016, XP030022739, 33 pages.

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pp.

Chen J., et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, 6th Meeting; Hobart, AU, Mar. 31-Apr. 7, 2017, Document: JVET-F1001-v3, Jun. 30, 2017, 48 pages.

Chen J., et al., "Algorithm Description of Joint Exploration Test Model 3", Document: JVET-C1001_v3, Joint Video.Exploration Team (JVET) of ITU-T SG 16 WP 3 and ISO/IEC JTC 1/SC 29/WG 11, 3rd Meeting: Geneva, CH, May 26-Jun. 1, 2016, 37 pages.

Flynn D., et al., "High Efficiency Video Coding (HEVC) Range Extensions text specification: Draft7," JCT-VC meeting, MPEG meeting; Mar. 27-Apr. 14, 2014; Incheon, KR; (Joint Collaborative Team On Video Coding Of ISO/IEC JTC1/SC29/WG11 and ITU-T SG-16); Document: JCTVC-Q1005_v4, 376 pp.

Han, et al., "Improvements to Intra Prediction Mode Coding," Joint Video Exploration Team (JVET) of ITU-T SG16 WP3 and ISO/IEC JTC1/SC29/WG11; 7th Meeting; Torino, IT, Jul. 13-21, 2017, document No. JVET-G0060, Jul. 5, 2017, 4 pp.

Huang H., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.

International Search Report and Written Opinion—PCT/US2017/031924—ISA/EPO—dated Jul. 26, 2017.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Kim S-H., et al., "Further improvement of intra coding tools," Joint Video Exploration Team (JVET) of ITU-T SG 16 WP 3 and ISO/IEC JTC 1/SC 29/WG 11, 2nd Meeting; San Diego, USA, Feb. 20-26, 2016, document No. JVET-B0051, San Diego, USA, Feb. 20, 2016, pp. 1-5.

Response to Written Opinion dated Jul. 26, 2017 from International Application No. PCT/US2017/031924, filed on Mar. 13, 2018, 32 pp.

Second Written Opinion from International Application No. PCT/US2017/031924, dated Apr. 9, 2018, 7 pp.

Sekiguchi S., et al., "Improved Entropy Coding for Intra Prediction Modes", 17th JVT Meeting, 74 MPEG Meeting, (Joint Video Team of ISO/IEC JTC1/SC29/WG11 and ITU-T SG.16), No. JVT-Q032, Oct. 12, 2005, XP030006195, 11 pages.

Seregin V., et al., "Block Shape Dependent Intra Mode Coding", 4 JVET Meeting, Chengdu, (The Joint Video Exploration Team of ISO/IEC JTC1/SC29/WG11 and ITU-T SG.16), URL: http://phenix.int-evry.fr/jvet/,,No. JVET-D0114-v3, Oct. 15, 2016, XP030150362, 3 pages.

Seregin V., et al., "Block Shape Dependent Intra Mode Coding," Joint Video Exploration Team (JVET) of ITU-T SG16 WP3 and ISO/IEC JTC1/SC29/WG11; 7th Meeting; Torino, IT, Jul. 13-21, 2017, document No. JVET-G0159, Jul. 16, 2017, XP030150970, sections 1 and 2, 3 pages.

Seregin V., et al., "Variable Number of Intra Modes", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/ , No. JVET-D0113, Oct. 6, 2016 (Oct. 6, 2016), XP030150359, pp. 1-2.

(56) References Cited

OTHER PUBLICATIONS

Seregin V., et al., "Neighbor based intra most probable modes list derivation," JVET Meeting; Geneva, CH; May 26, 2016-Jan. 6, 2016; (The Joint Video Exploration Team of ISO/IEC JTC1/SC29/WG11 and ITU-T SG.16), JVET-C0055, 16, May 2016; 4 pp.

Suehring K., et al., "JVET common test conditions and software reference configurations," Joint Video Exploration Team (JVET) of ITU-T SG16 WP3 and ISO/IEC JTC1/SC29/WG11, 2nd Meeting: San Diego, USA, Feb. 20-26, 2016, Document: JVET-B1010, 4 pages.

Wang Y., et al., "High Efficiency Video Coding (HEVC) Defect Report 2," JCT-VC Meeting; Oct. 23-Nov. 1, 2013; San Jose; (Joint Collaborative Team on Video Coding of ISO/IEC JTC1/SC29/WG11 and ITU-T SG.16); No. JCTVC-O1003_v2; Nov. 24, 2013; 311 pp.

Prosecution History from U.S. Appl. No. 15/590,261, dated Oct. 25, 2018 through Jan. 8, 2020, 60 pp.

Bross B., et al., "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 238 Pages.

Chen J., et al., "Algorithm Description of Joint Exploration Test Model 2", Joint Video Exploration Team (JVET) of ITU-T SG 16 WP 3 and ISO/IEC JTC 1/SC 29/WG 11, 2nd Meeting, San Diego, CA, USA, Feb. 20-26, 2016, [JVET-B1001_v3], Mar. 25, 2016 (Mar. 25, 2016), 32 pp., JVET-B1001 (Version 3), pp. 6-7.

Maani E., et al., "Intra Mode Coding using Logical Mode Numbering", Joint Collaborative Team on Video Coding (JCT-VC) of ITU-TSG16 WP3 and ISO/IEC JTC1/SC29/WG11, 8th Meeting: San Jose, CA, USA, Feb. 1-10, 2012, [JCTVC-H0407], Feb. 5, 2012, JCTVC-H0407 (version3), pp. 1-5.

\* cited by examiner

NEIGHBOR BASED SIGNALING OF INTRA PREDICTION MODES

This application is a continuation of U.S. application Ser. No. 15/590,261, filed 9 May 2017, which claims the benefit of U.S. Provisional Application 62/336,414 filed 13 May 2016 and U.S. Provisional Application 62/404,128 filed 4 Oct. 2016, the entire content each of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra picture) prediction and/or temporal (inter picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra coded (I) slice of a picture are encoded using spatial prediction with respect to reference samples in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter coded block is encoded according to a motion vector that points to a block of reference samples forming the predictive block, and the residual data indicating the difference between the coded block and the predictive block. An intra coded block is encoded according to an intra coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to intra prediction and, more particularly, to techniques for signaling, from a video encoder to a video decoder, information used by the video decoder to determine the intra prediction mode that is to be used to decode a particular block of video data.

In one example, a method for decoding video data includes determining that a current block of video data is coded using an intra prediction mode; adding an intra prediction mode of a first neighboring block of the current block to a most probable mode candidate list for the current block; adding an intra prediction mode for a second neighboring block of the current block to the most probable mode candidate list for the current block; adding an intra prediction mode for a third neighboring block of the current block to the most probable mode candidate list for the current block; determining an intra prediction mode using the most probable mode candidate list; and decoding the current block of video data using the intra prediction mode.

In another example, a device for decoding video data includes a memory configured to store the video data and one or more processors configured to determine that a current block of the video data is coded using an intra prediction mode; add an intra prediction mode of a first neighboring block of the current block to a most probable mode candidate list for the current block; add an intra prediction mode for a second neighboring block of the current block to the most probable mode candidate list for the current block; add an intra prediction mode for a third neighboring block of the current block to the most probable mode candidate list for the current block; determine an intra prediction mode using the most probable mode candidate list; and decode the current block using the intra prediction mode.

In another example, a method for encoding video data includes, determining that a current block of video data is coded using an intra prediction mode; adding an intra prediction mode of a first neighboring block of the current block to a most probable mode candidate list for the current block; adding an intra prediction mode for a second neighboring block of the current block to the most probable mode candidate list for the current block; adding an intra prediction mode for a third neighboring block of the current block to the most probable mode candidate list for the current block; determine an intra prediction mode using the most probable mode candidate list; and encoding the current block of video data using the intra prediction mode.

In another example, a device for encoding video data includes a memory configured to s tore the video data and one or more processors configured to determine that a current block of video data is coded using an intra prediction mode; add an intra prediction mode of a first neighboring block of the current block to a most probable mode candidate list for the current block; add an intra prediction mode for a second neighboring block of the current block to the most probable mode candidate list for the current block; add an intra prediction mode for a third neighboring block of the current block to the most probable mode candidate list for the current block; determine an intra prediction mode using the most probable mode candidate list; and encode the current block of video data using the intra prediction mode.

In another example, a computer readable storage medium storing instructions that when executed by one or more processors cause the one or more processors to determine that a current block of video data is coded using an intra prediction mode; add an intra prediction mode of a first neighboring block of the current block to a most probable mode candidate list for the current block; add an intra prediction mode for a second neighboring block of the current block to the most probable mode candidate list for the current block; add an intra prediction mode for a third neighboring block of the current block to the most probable mode candidate list for the current block; determine an intra prediction mode using the most probable mode candidate list; and decode the current block using the intra prediction mode.

In another example, a device for decoding video data includes means for determining that a current block of video data is coded using an intra prediction mode; means for adding an intra prediction mode of a first neighboring block of the current block to a most probable mode candidate list for the current block; means for adding an intra prediction mode for a second neighboring block of the current block to the most probable mode candidate list for the current block; means for adding an intra prediction mode for a third neighboring block of the current block to the most probable mode candidate list for the current block; means for determining an intra prediction mode using the most probable mode candidate list; and means for decoding the current block of video data using the intra prediction mode.

In another example, a computer readable storage medium stores instructions that when executed by one or more processors cause the one or more processors to determine that a current block of video data is coded using an intra prediction mode; add an intra prediction mode of a first neighboring block of the current block to a most probable mode candidate list for the current block; add an intra prediction mode for a second neighboring block of the current block to the most probable mode candidate list for the current block; add an intra prediction mode for a third neighboring block of the current block to the most probable mode candidate list for the current block; determine an intra prediction mode using the most probable mode candidate list; and encode the current block of video data using the intra prediction mode.

In another example, a device for encoding video data includes means for determining that a current block of video data is coded using an intra prediction mode; means for adding an intra prediction mode of a first neighboring block of the current block to a most probable mode candidate list for the current block; means for adding an intra prediction mode for a second neighboring block of the current block to the most probable mode candidate list for the current block; means for adding an intra prediction mode for a third neighboring block of the current block to the most probable mode candidate list for the current block; means for determining an intra prediction mode using the most probable mode candidate list; and means for encoding the current block of video data using the intra prediction mode.

The details of one or more examples of the disclosure are set forth in the accompanying drawings and the description below. Other features, objects, and advantages will be apparent from the description, drawings, and claims.

DETAILED DESCRIPTION

Figure 1:
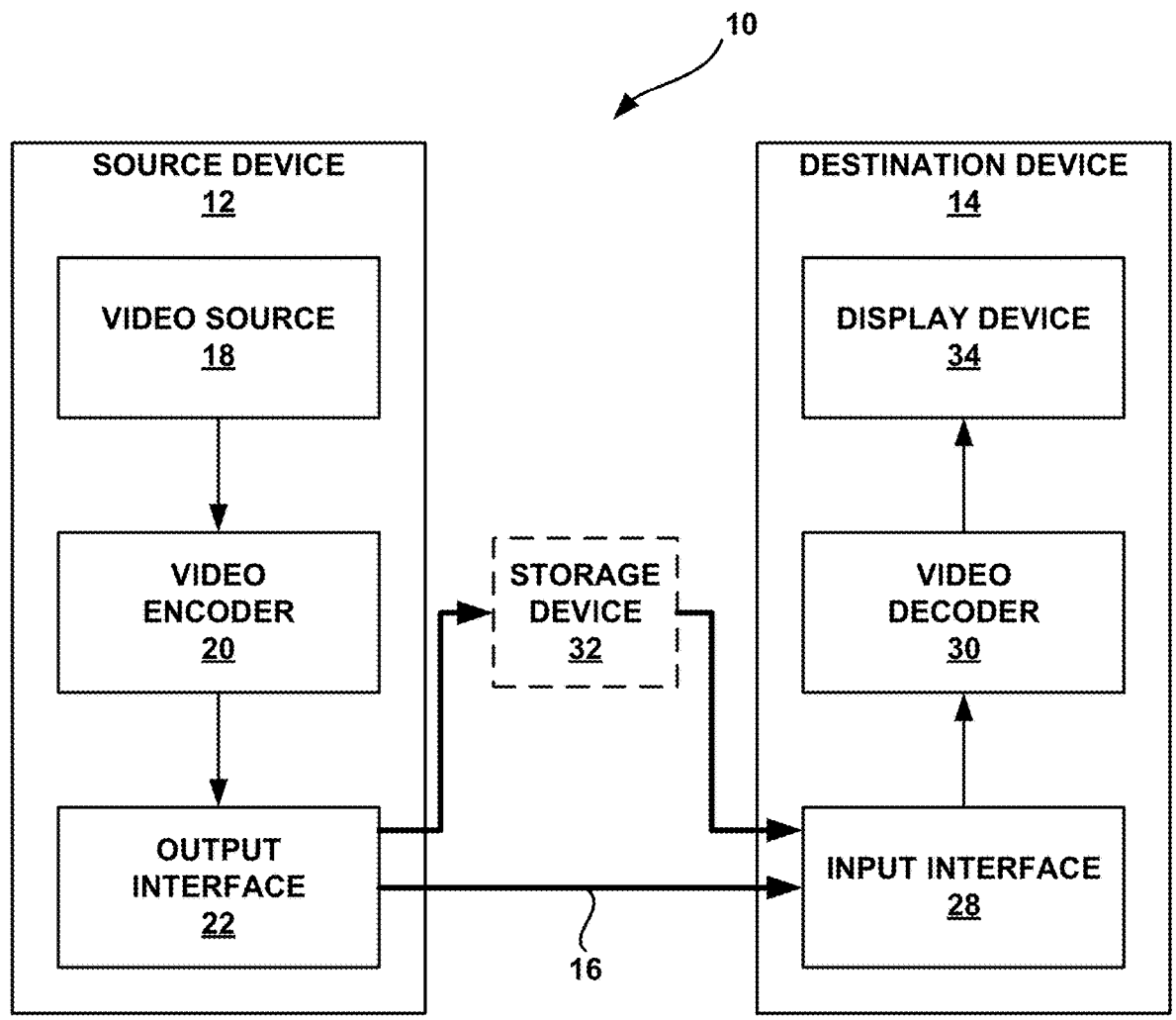
FIG. 1 is a block diagram illustrating an example video encoding and decoding system that may utilize the techniques described in this disclosure.

Various video coding standards, including the recently developed High Efficiency Video Coding (HEVC) standard include predictive coding modes for video blocks, where a block currently being coded is predicted based on an already coded block of video data. In an intra prediction mode, the current block is predicted based on one or more previously coded, neighboring blocks in the same picture as the current block, while in an inter prediction mode the current block is predicted based on an already coded block in a different picture. In inter prediction mode, the process of determining a block of a previously coded frame to use as a predictive block is sometimes referred to as motion estimation, which is generally performed by a video encoder, and the process of identifying and retrieving a predictive block is sometimes referred to as motion compensation, which is performed by both video encoders and video decoders. Extensions of HEVC and successors to HEVC may also use additional coding modes, such as intra block copy, dictionary, and palette coding modes.

This disclosure describes techniques related to intra prediction and, more particularly, to techniques for signaling, from a video encoder to a video decoder, information used by the video decoder to determine the intra prediction mode that is to be used to decode a particular block of video data. This disclosure describes techniques for determining a list of most probable intra prediction modes for a block of video data and techniques for signaling which of the most probable intra predictions mode from the list of most probable intra predictions modes was used to encode a block of video data so that the video decoder can use that intra prediction mode to decode the block of video data. In this disclosure, most probable intra predictions modes may also be referred to simply as most probable modes or MPMs. The list of most probable intra prediction modes may also be referred to simply as a most probable mode candidate list or an MPM candidate list.

According to techniques of this disclosure that are described in more detail below, when a block is coded using an intra prediction mode, a video encoder may determine an MPM candidate list for the block. A video decoder may determine the same MPM candidate list as determined by the video encoder by implementing the same MPM candidate list construction process implemented by the video encoder. As the video encoder and video decoder construct the same MPM candidate lists, the video encoder can signal an intra prediction mode to the video decoder by signaling an index value that corresponds to a particular candidate in the MPM candidate list. Unless explicitly stated to the contrary, the MPM candidate list construction techniques described herein can be performed by either a video encoder or a video decoder.

The MPM candidate list may, for example, include a relatively small subset of all available intra prediction modes. As one example, the total number of intra prediction modes may be 35 as supported by HEVC or over 60 as is contemplated for successor standards to HEVC, and the number of most probable modes included in an MPM candidate list may be 5 or 6, or some other number, or may be variable. Modes that are not part of the MPM candidate list may be referred to as non-most probable modes. The techniques of this disclosure are not limited to any particular number of intra prediction modes or most probable modes.

Techniques for determining which intra prediction modes are most probable modes for any given block are described in more detail below. The intra prediction modes selected as most probable modes for a particular block generally correspond to intra prediction modes that are statistically more likely to be used for coding the block. As will be explained in more detail below, when signaling the actual intra prediction mode for a block of video data, different signaling techniques may be used if the actual intra prediction modes is one of the most probable modes (e.g., an intra prediction mode in the MPM candidate list) than if the actual intra prediction is one of the non-most probable modes. The techniques utilized for signaling most probable modes may, on average, utilize fewer bits than the signaling techniques utilized for the non-most probable modes. Therefore, if the actual intra prediction mode is more frequently a most probable mode than a non-most probable mode, then an overall bit savings can be achieved by more frequently using the lower-bit signaling technique associated with most probable modes.

This disclosure describes techniques for determining which most probable modes to include in an MPM candidate list, and describes techniques related to signaling the actual intra prediction mode for a block in instances when the actual intra prediction mode is one of the most probable modes. This disclosure describes techniques related to intra prediction mode signaling, and more particularly, this disclosure describes techniques for using intra prediction modes of already coded neighbor blocks as a predictor of most probable modes. Additionally, this disclosure describes techniques for signaling most probable mode-related information using entropy coding with contexts.

This disclosure may at times refer to a video coder. Video coder is intended to be a generic term that refers to either video encoding or video decoding. Likewise, the term video coding is intended to be a generic term that refers to either video encoding or video decoding. Certain techniques may be described with respect to either video encoding or video decoding, but unless explicitly stated otherwise, it should not be assumed that those techniques are not equally applicable to the other of video encoding or video decoding. Thus, even if certain techniques of this disclosure are described with respect to one of a video encoder or video decoder, the techniques should generally be assumed to also be applicable to the other of the video encoder or video decoder.

This disclosure, for example, describes techniques for generating an MPM candidate list and for determining contexts for entropy coding certain information. The techniques for generating the MPM candidate list and determining the contexts performed by a video encoder may be the same as performed by a video decoder, such that the video decoder can determine the same MPM candidate list or the same context as the encoder with little or no explicit signaling from the video encoder to the video decoder.

FIG. 1 is a block diagram illustrating an example video encoding and decoding system 10 that may utilize the techniques described in this disclosure, including techniques for encoding and decoding blocks in an intra prediction mode. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 17. Similarly, encoded data may be accessed from storage device 17 by input interface. Storage device 17 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 17 may correspond to a file server or another intermediate storage device that may hold the encoded video generated by source device 12. Destination device 14 may access stored video data from storage device 17 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 17 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 17 for later access by destination device 14 or other devices, for decoding and/or playback.

Destination device 14 includes an input interface 28, a video decoder 30, and a display device 34. In some cases, input interface 28 may include a receiver and/or a modem. Input interface 28 of destination device 14 receives the encoded video data over link 16. The encoded video data communicated over link 16, or provided on storage device 17, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 34 may be integrated with, or external to, destination device 14. In some examples, destination device 14 may include an integrated display device and also be configured to interface with an external display device. In other examples, destination device 14 may be a display device. In general, display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as HEVC, and may conform to the HEVC Test Model (HM). A working draft of the HEVC standard, referred to as "HEVC Working Draft 10" or "HEVC WD10," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013. Another HEVC draft specification is available from http://phenix.int-evry.fr/jct/doc_end_user/documents/15_Geneva/wg11/JCTVC-O1003-v2.zip. The techniques described in this disclosure may also operate according to extensions of the HEVC standard that are currently in development.

Alternatively or additionally, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Video coding standards also include proprietary video codecs, such Google VP8, VP9, VP10, and video codecs developed by other organizations, for example, the Alliance for Open Media.

The design of the HEVC has been finalized by the JCT-VC of ITU-T Video Coding Experts Group (VCEG) and ISO/IEC Motion Picture Experts Group (MPEG). The Range Extensions to HEVC, referred to as HEVC RExt, are also being developed by the JCT-VC. A recent Working Draft (WD) of Range extensions, referred to as RExt WD7 hereinafter, is available from http://phenix.int-evry.fr/jct/doc_end user/documents/17_Valencia/wg11/JCTVC-Q1005-v4.zip.

This disclosure will generally refer to the recently finalized HEVC specification text as HEVC version 1 or base HEVC. The range extension specification may become the version 2 of the HEVC. With respect to many coding tools, such as motion vector prediction, HEVC version 1 and the range extension specification are technically similar. Therefore, whenever this disclosure describes changes relative to HEVC version 1, the same changes may also apply to the range extension specification, which generally includes the base HEVC specification, plus some additional coding tools. Furthermore, it can generally be assumed that HEVC version 1 modules may also be incorporated into a decoder implementing the HEVC range extension.

New video coding standards, such as the JVET test model, are presently under development as successors to HEVC. This disclosure will describe certain video techniques using HEVC terminology for ease of explanation. It should be understood, however, that such techniques are not limited to HEVC and may be applicable to video coding standards other than HEVC.

It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RB SP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

To increase the variety of intra prediction modes included in an MPM candidate list, this disclosure describes techniques for including intra prediction modes from neighbor blocks in the MPM candidate list as well as techniques for including default and derived candidates in the MPM candidate list. The techniques of this disclosure may improve the coding efficiency associated with signaling intra prediction modes by increasing the probability that the actual intra prediction mode used to encode a block of video data will be a most probable mode. As signaling a most probable mode typically requires fewer bits than signaling a non-most probable mode, having the actual intra prediction mode used to encode a block of video data be a most probable mode more frequently may reduce the signaling overhead associated with signaling intra prediction modes.

The techniques described in this disclosure can be used to generate an MPM candidate list of any size (generically referred to herein as size N). In some examples, N may be equal to 6 as currently contemplated in the JVET, but other larger or smaller values for N may also be used. The techniques of this disclosure are not limited to any particular value of N.

Figure 2:
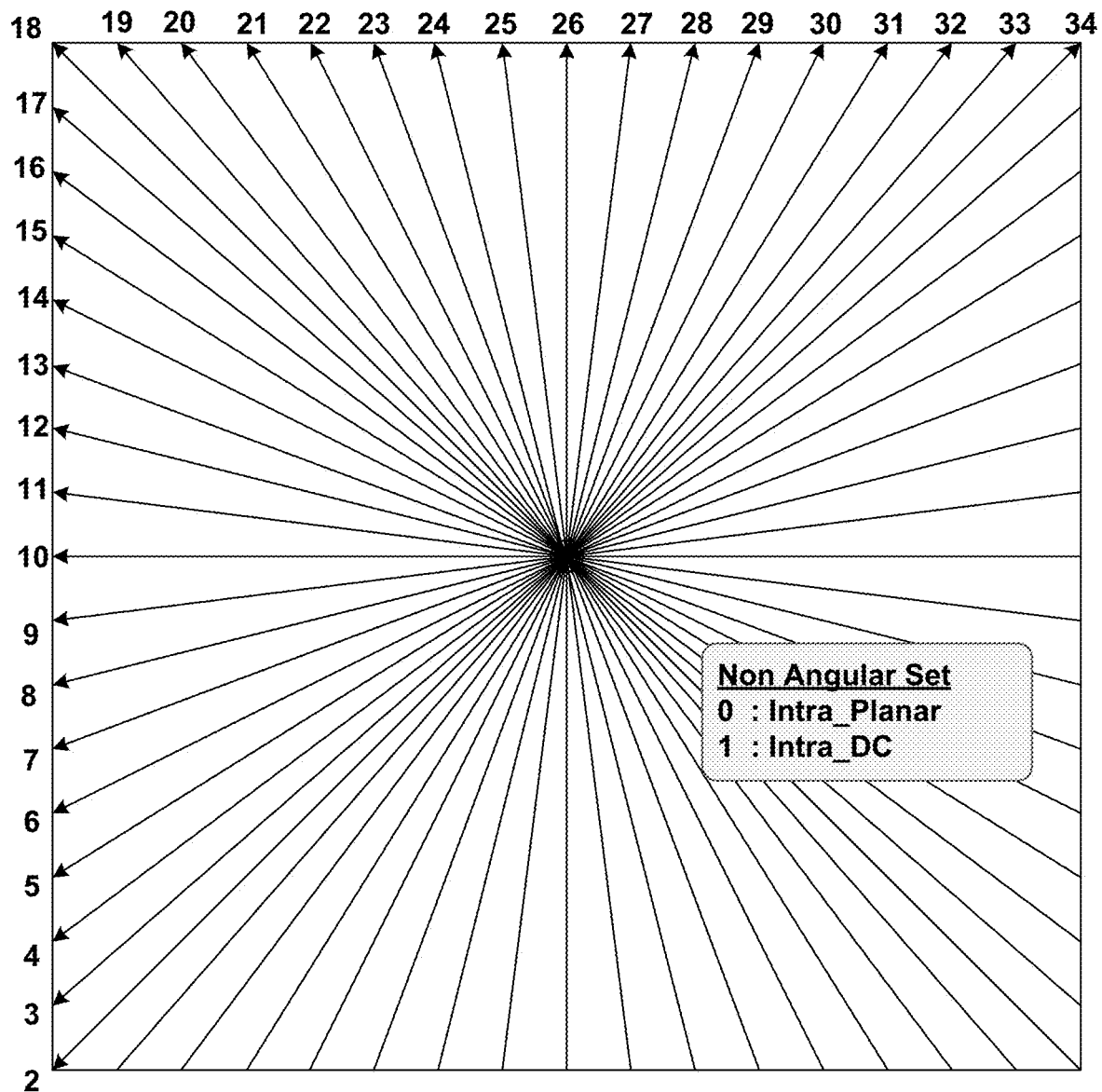
FIG. 2 shows an example illustration of the intra prediction modes used in HEVC.

FIG. 2 shows an example of the intra prediction modes used in HEVC. The 35 intra prediction modes of HEVC include 33 directional modes (shown with mode indexes 2 to 34 in FIG. 2) plus two non-directional modes referred to as DC mode (mode index 1 in FIG. 2) and planar mode (mode index 0 in FIG. 2). The techniques of this disclosure may be applied for any number of directional modes used for intra prediction. For example, the number of modes may be 35 as used in HEVC, or may be 63, 66, or some other number of modes greater than 35, as is being contemplated for successor standards to HEVC. The described techniques may be applied for intra prediction mode coding of only a selected color components, such as only a luma component or only a chroma component, or may be applied for all available color components (luma and both chroma), or in any other combination.

According to the techniques of this disclosure, a video coder, such as video encoder 20 or video decoder 30, may check three or more neighboring blocks of a group of neighboring blocks to identify intra prediction modes to add to an MPM candidate list for a current block. If a neighboring block is coded using an intra prediction mode, then the video coder may add the intra prediction mode used to code the neighboring block to the MPM candidate list for the current block. The locations of the neighbor blocks checked by the video coder may be fixed relative to the current block. For example, the locations of the neighbor blocks may be a left (L) block, an above (A) block, a below left (BL) block, an above right (AR) block, and/or an above left (AL) block. Other neighboring blocks may also be used. The order in which intra prediction modes from the neighbor blocks are added to the MPM candidate list may be fixed or may vary, for example the order can depend on the current block size, whether the block is of a certain shape, such as rectangular or square, or based on context information.

Five neighbor locations are provided as an example, but fewer or more neighbor blocks can be considered in the construction of the MPM candidate list using the described techniques. One example with more than five locations is shown in FIG. 3E.

The location for a neighboring block may be represented by a sub-block size, for example 4×4, meaning that it is the granularity at which intra prediction mode information is stored. In another example, intra prediction mode information can be specified per pixel or for larger blocks, such as 8×8. If chroma is subsampled comparing to luma component, such as in 4:2:0 color format, then the chroma component sub-block location may be smaller, for example 2×2, which may correspond to luma 4×4.

In some examples, depending on the neighbor block size, the locations may belong to the same block. For example, if a neighbor block is 16×16 and the currently coded block is 8×8, then the above left and left locations may correspond to the same 16×16 neighbor block, where the intra prediction mode information would be the same in those locations.

The number of neighbor locations M can be equal to the MPM candidate list size N, but may be smaller or larger. In one example, the number M may always be smaller than N to allocate some room to include other types of intra prediction modes into MPM candidate list. The number of locations can depend on the current and/or neighbor block's characteristics, such as block size, whether a block is square or rectangular, whether the rectangular block is a horizontal block (i.e, width is greater than height), the ratio between height and width, the ratio between the larger and smaller value of height and width, or whether the block is a vertical block (width is smaller than height) oriented. The number of locations may also depend on the neighbor block's prediction mode (e.g., intra or inter).

In another example, the neighbor block locations and intra prediction modes order, in which the intra prediction modes are added into the MPM candidate list, can be different. For example, the order may be different for certain blocks and can depend, for example, on the current block size, whether the current block is square or rectangular, whether the current block is vertically oriented (width is smaller than height), or horizontally oriented (width is larger than height).

In yet another example, the locations and intra prediction modes order can depend on the neighbor blocks characteristics. The characteristics, for example, can be neighbor blocks prediction mode (intra or inter), of neighbor block size, whether neighbor block is square or rectangular, whether neighbor block is vertically oriented (width is smaller than height), the ratio between height and width, the ratio between the larger and smaller value of height and width, or horizontally oriented (width is larger than height).

In another example, the locations of the neighbor blocks relative to the current block can be the same as in merge or advanced motion vector prediction (AMVP) inter prediction modes. This unification can have an implementation benefit, as the same function can be reused for inter and intra prediction modes.

In general, a video coder can generate an MPM candidate list from different MPM types. The different types may include, but are not limited to, neighbor-based intra prediction modes, derived intra prediction modes, and default intra prediction modes. A neighbor-based intra prediction mode indicates an intra prediction mode that is used for a neighboring block. A default intra prediction mode refers to a constant intra prediction mode that does not change with the neighboring blocks. The default intra prediction mode(s) may, for example, be planar mode, DC mode, horizontal mode, or vertical mode. A derived intra prediction mode refers to an intra prediction mode that is derived based on a neighbor-based intra prediction mode or a default intra prediction mode. For example, a derived intra prediction mode may be a neighbor-based intra prediction mode ±1, ±2, etc. A derived intra prediction mode can be also generated by another existing derived intra prediction mode. A derived intra prediction mode may not be the actual intra prediction mode of a neighboring block, but rather, may be an intra prediction mode that is derived from the actual intra prediction mode of a neighboring block or derived in some other manner.

The video coder may add intra prediction modes to the MPM candidate list according to the intra prediction mode type. As one example, the video coder may first add neighbor-based intra prediction modes, then add derived modes, and then add the default modes. In another example, the video coder may add intra prediction modes with different types in an interleaved manner. For example, the video coder may add one or more default modes after adding a certain number of neighbor-based intra prediction modes to the list. For example, the video coder may add two neighbor-based modes, then two default modes, then add more neighbor-based intra prediction modes.

Figure 3A:
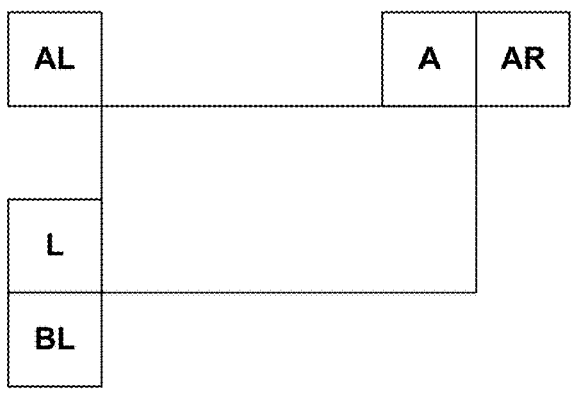
FIGS. 3A-3E show examples of locations for neighbor blocks of a current block.
Figure 3B:
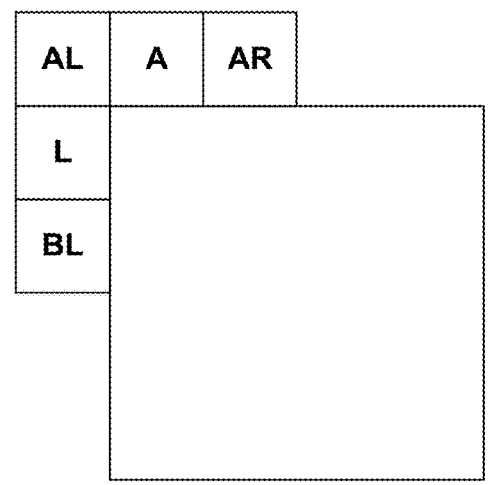
Figure 3C:
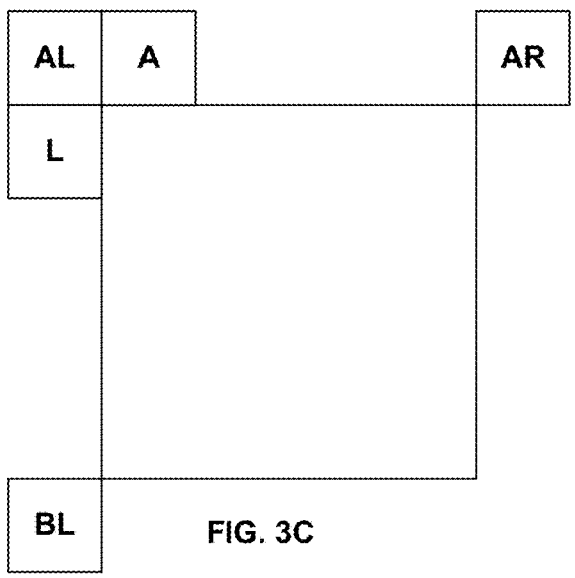
Figure 3D:
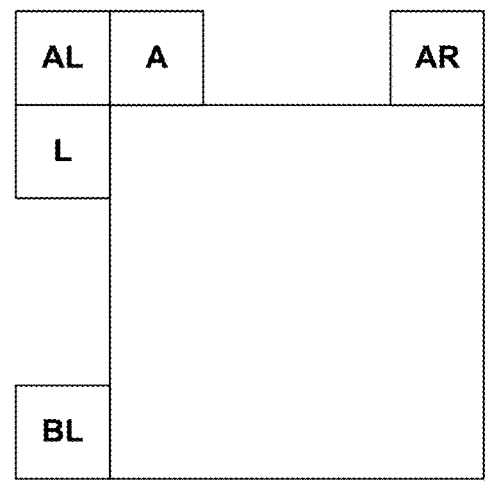
Figure 3E:
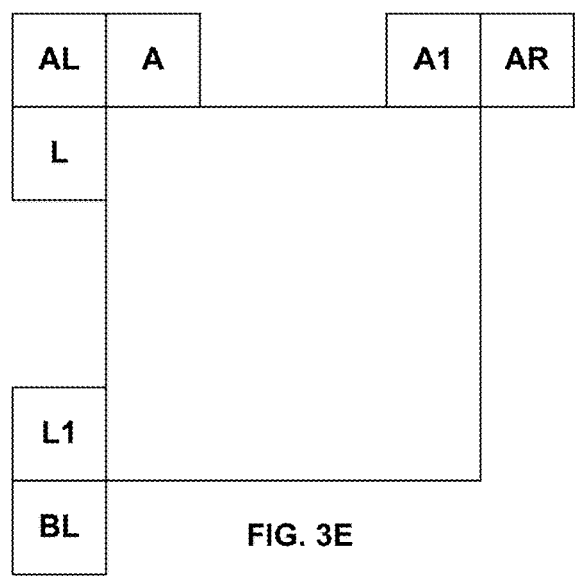

FIGS. 3A-3E show examples of locations for the neighbor blocks, some examples are shown, blocks can be rectangular or squares. FIG. 3C shows an example unified with the merge/AMVP modes. FIG. 3D shows an example with greater number of the neighbor locations. Some center locations on the left or above, not showed on the figure, can be also used.

Aspects of MPM candidate list construction and derived modes will now be described. When neighbor-based intra prediction modes are considered to be included into the MPM candidate list, only unique intra prediction modes can be added to the list. For example, if one neighbor block has the same intra prediction mode, which is already added to the MPM candidate list, then such mode is not added to the list a second time.

The video coder may only add a certain number (K) of neighbor-based intra prediction modes to the MPM candidate list of size N. For example, M neighbor locations may be considered, but only K, which can be smaller than M, number of neighbor-based intra prediction modes may be added to the MPM candidate list. For example, a video coder may add neighbor-based intra prediction modes from certain locations in a certain order, and once the number of added neighbor modes has reached K modes, the video coder may stop adding neighbor-based intra prediction modes into the MPM candidate list. In some example, K may represent a number of unique modes and not necessarily a number of considered modes. In other words, if duplicate modes are considered (e.g., two neighboring blocks have the same intra prediction mode), the video coder may only add one instance of the mode to the MPM candidate list. Only adding K neighbor-based intra prediction modes to the MPM candidate list may reserve space in the MPM candidate list for other types of modes, such as derived intra prediction modes and/or default intra prediction modes, described in more detail below.

After the video coder adds intra prediction modes from the neighbor blocks to the MPM candidate list, the MPM candidate list may still not be complete (number of modes is less than N) because, for example some modes are the same and are not added to the list. However, it can be required that the MPM candidate list has to be always complete, e.g. has the size of N.

In this case, intra prediction modes need to be added to the list. Those additional modes can be classified into two types: intra prediction modes derived from the intra prediction modes already added to the MPM candidate list and default intra prediction modes.

Derived intra prediction modes are the modes derived from the intra prediction modes already added to the MPM candidate list. For example, the derived intra prediction mode can be a mode obtained by adding certain offset to a mode from the MPM candidate list. The offset can be −+1, −+2, and so on. The offset value can depend on the current or neighbor block characteristics as explained above.

When more than one offset values are intended to be used to derive intra prediction modes, the offsets can be applied in the certain order. The order can depend, for example, on the block characteristics. For example, in the beginning, the first offset is applied to all intra prediction modes already added to the MPM candidate list, then the second offset value is applied to already added modes into MPM candidate list, and so on.

In another example, all offset values are applied to the first intra prediction mode from the MPM candidate list, then all offset values are applied to the second intra prediction mode from the MPM candidate list, and so on.

In yet another example, in the above example, the offset value can be replaced with an offset set. For example, the offset set can be composed from the offset value of the same magnitude. For example, −+1 may be one offset set, −+2 may be the second offset set, and so on. In another example, offset set may be composed from the offset values having the same sign. For example, +1, +2, . . . may be one set, while −1, −2, . . . is a second set. The above two examples can be combined. In another example, an offset set may be composed as a subset from all possible offset values, where subset, for example, can be dependent on the intra prediction mode to which the offset is going to be applied. For example, one intra prediction mode may have a certain subset of the offset values, and another intra prediction mode may have another subset of the offset values, which may be difference form the first sub-set.

Offset value may not be applied for certain intra prediction modes, for example offset is not applied to non-angular modes such as DC, PLANAR, or LM modes, offset may not be applied to the derived or default intra prediction modes.

Another method of creating derived modes can be a rotation. For example, rotated derived modes may be created from the neighbor-based intra prediction modes by rotating the mode by certain angle. The angle can be, for example, 45, 90, or 180 degree or any other value. For example, if the rotation angle is equal to 90 degrees and neighbor mode is horizontal intra prediction mode, then the derived mode may be vertical mode. As another example, if the neighbor mode is horizontal modes, then the derived mode is the vertical mode. The same technique can be applied to other directional modes or rotation angles.

The rotation can be applied only to the certain neighbor modes, for example, rotation may not be applied to non-angular modes. In another example, rotation usage can depend on the current or neighbor blocks characteristics described above. For example, rotation can be applied only to the modes if the current or neighbor blocks have rectangular shape.

In some implementations, only unique derived modes can be added to the list. Therefore, if an intra prediction mode that is equal to the derived intra prediction mode is already added to the MPM candidate list, the derived mode may not be added to the MPM candidate list. In some implementations, only a certain number of the derived modes may be added to MPM candidate list. The number may be fixed. In another example, the number of derived modes added to the list may be equal to the MPM candidate list size N minus number of modes form the neighbor blocks M. In general, derived modes can be kept adding until the MPM candidate list is not complete.

In some coding scenarios, intra prediction modes from the neighbor blocks and derived modes may not be enough to complete the MPM candidate list. In one example, there may be a coding scenario where there are no intra prediction modes available from the neighbor blocks because, for example, the current block is at a picture boundary or all neighbor blocks are inter coded. In such a case, derived modes may not be available either.

To complete the MPM candidate list, default intra prediction modes can be added to the list. The number of the default intra prediction modes may have to be equal to the desired MPM candidate list size, since the entire MPM candidate list may be composed from the default modes. However, in examples where there are already some modes identified in the MPM candidate list, inclusion of default intra prediction modes may ensure that the MPM candidate list is full.

The default modes, can be basically the subset of the possible intra prediction modes, and those modes can be unique. The intra prediction modes selected for the default modes can be fixed, or be dependent on the current or neighbor block characteristics.

In another example, certain modes can always be added as the default modes. Such modes can be, for example, PLANAR, DC, vertical mode, horizontal mode, diagonal modes, for example, left (from top left corner toward bottom right corner of the block) or right (from top right corner towards bottom left corner of the block) diagonal modes. The default modes and the order in which the default modes are added to MPM candidate list can be fixed or can be dependent on characteristics of the current block and/or on characteristics of the neighbor blocks.

In one example, the default mode list can be PLANAR, DC, vertical, horizontal, left diagonal, right diagonal. In another example, the default mode list may be PLANAR, DC, vertical, horizontal, vertical minus 1, horizontal minus 1. For chroma component, the default mode can be DM or LM modes. In addition, one or more derived default modes can be maintained and updated during encoding and decoding, the default modes can be most frequently used modes in the previously coded blocks. The derived default modes can be applied in a way that one or more default modes are replaced by the derived default modes when generating the MPM candidate list.

In another example, the full default mode list can be derived from the smaller mode list by applying offset or rotation technique described above for obtaining the derived modes. Also, it can be a requirement that the default mode list shall include only unique intra prediction modes.

In another example, some default modes can be added into the list prior to the certain neighbor locations or after the certain number of neighbor-based intra prediction modes already included to the MPM candidate list, for example after two neighbor-based intra prediction modes some default intra prediction modes are added.

In one example, left and above intra prediction modes, which may be unique, equal, or not available, are added to the MPM candidate list, and then non-angular default modes, such as PLANR or DC, are added to the MPM candidate list. After the defaults modes are added to the MPM candidate list, more neighbor-based intra prediction modes according the neighbor blocks order are added to the MPM candidate list. Again, in some implementations, only unique modes are added to the list. The interleaving manner of adding modes can depend on the current and neighbor blocks characteristics.

Aspect of context modeling for the MPM modes will now be described. As will be explained in greater detail below with respect to FIGS. 9 and 10, the context model used for entropy coding may affect the data compression achieved by the entropy coding process. Therefore, context modeling may affect the overall compression achieved by a video encoder. This disclosure describes techniques for choosing a context model for use in signaling intra prediction modes that may improve overall video compression.

If the current intra prediction mode to be coded is equal to one of the MPM modes, then the video coder may signal the current intra prediction using context coded bins corresponding to the MPM modes. For example, the bins to be signaled can be defined by the binarization, and the binarization can be any codeword derivation scheme, such as unary, truncated unary, fixed binary, Golomb, Exponential Golomb, Rice and any other binarizations without limitation. The binarization can be applied to the MPM index, e.g. the MPM mode from the MPM candidate list at a certain position, to which the current intra prediction mode is equal to. This index can be signaled in bitstream. Each bin or a certain number of bins in the binarized representation can be context coded, the context can be derived according to the classification of the MPM modes.

For example, in the unary or truncated unary binarization or similar binarization, each bin corresponds to every mode from the MPM candidate list, for example 0 represents that the current mode is not equal to the mode from the MPM candidate list, and 1 represents that the current mode is equal to that MPM mode. Then, each bin or certain number of first bins can be context coded, and context is dependent on the corresponded MPM mode classification.

As one example, the MPM candidate list may be composed from {HOR, VER, PLANAR, DC, DIAG_LEFT, DIAG_RIGHT} modes. And let the current intra prediction mode to be coded is equal to PLANAR mode, e.g. the MPM index is 2 to be signaled. If binarization is truncated unary, then the binarization codeword is 001 corresponding to the index 2, the max value is equal to 5.
001: 0 (corresponds to MPM0) 0 (corresponds to MPM1) 1 (corresponds to MPM2). MPM0=HOR, MPM1=VER, MPM2=PLANAR, . . . .

As can be seen, each bin corresponds to a certain MPM mode from the list, and context for that bins are derived according to the MPMi classification, i=0 . . . 2 in this example. In this example, the MPM0 related context may be used for a horizontal set of modes, the MPM1 related context may be used for a vertical set of modes, and MPM2 related context may be used for a non-angular set of modes.

The classification of the MPM modes can be, for example, based whether intra prediction mode is angular or non-angular mode, or according to the angular direction, such as vertical or horizontal set.

In another example, all intra prediction modes can be classified into the three sets: non-angular, horizontal or vertical sets. Vertical set can be for example, the intra prediction modes closed to the vertical direction, for example modes with the −+45 degree angle from the vertical direction, horizontal set is similarly derived as the modes with −+45 degree angle from the horizontal direction.

Figure 4:
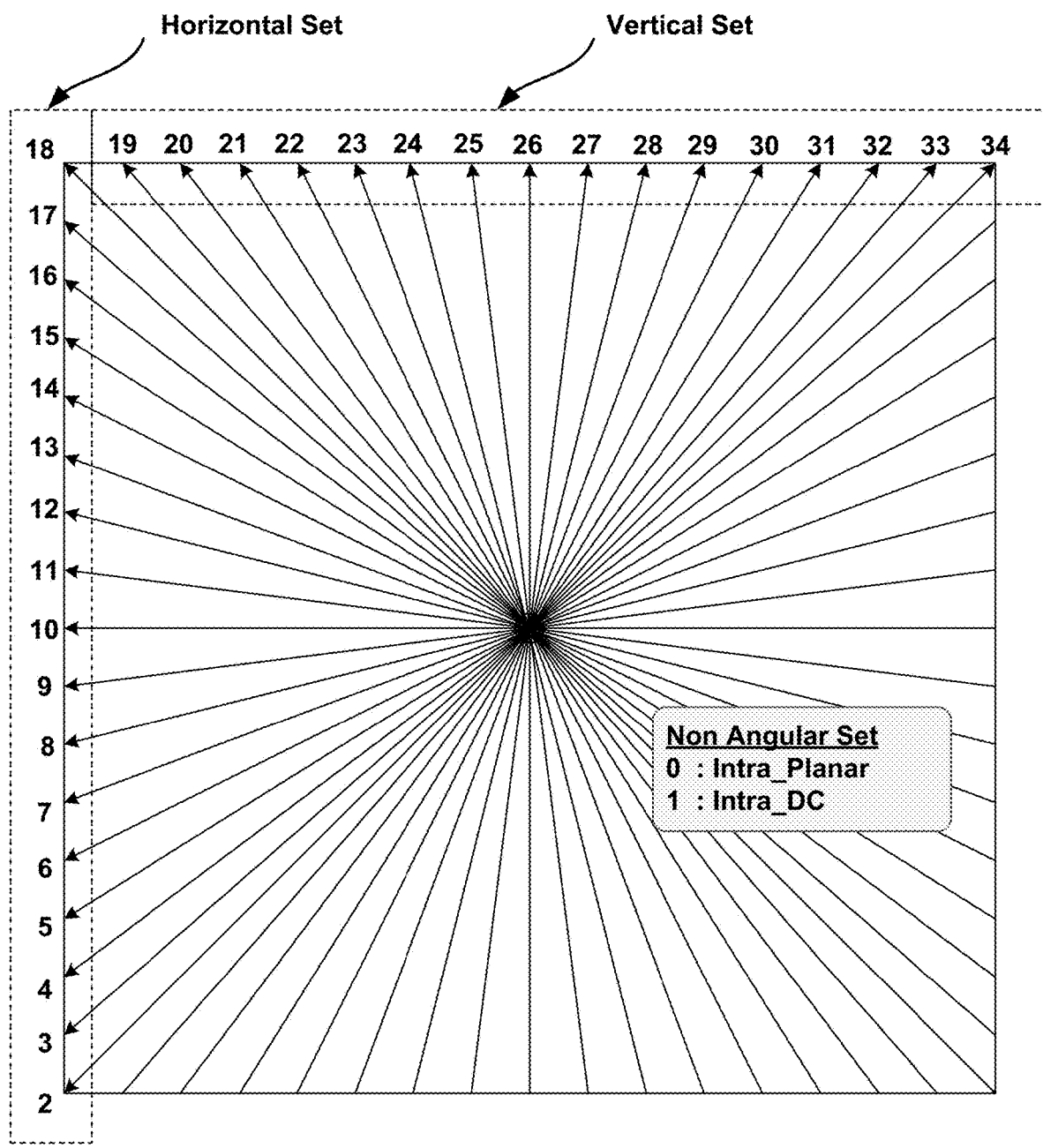
FIG. 4 shows an example of the MPM modes classification.

FIG. 4 shows an example of the MPM modes classification (one set is the horizontal set, one set is the vertical set, and one set is non angular set. Diagonal mode(s) (such as mode 18, including modes 2, 34, and similar modes in another example) may be classified into horizontal or vertical sets or can be included into a separated diagonal set).

In another example, all angular directions can be divided into more than horizontal or vertical sets. For example, the angular modes may be uniformly divided into some number of sets. Each intra prediction mode may be classified into one of the sets, for example as being in a certain angle range.

In another example, each set may include only one intra prediction mode, and the selection may be intra-mode specific.

Aspects of context modelling using intra prediction mode classification and generalization to most probable mode vectors (MPMV) will now be described. Intra prediction mode classification described above may be applied to the block's intra prediction mode and may be used to signal additional intra related syntax elements. It can be used for any method or syntax element that is applied or signaled after the intra prediction mode is coded, i.e., when intra prediction mode is already known at the decoder.

For example, PDPC and/or NSST indices, which respectively define the type of prediction and transform to be used for intra-prediction in a block, can be signaled using context modeling based on intra prediction mode classification. For every set in the classification, a separate context may be used.

Entropy coding can exploit statistical dependences between elements to be coded using the context-based techniques described above. Another method is based on combining the data and coding it together. For example, instead of using a list of only prediction modes (MPM), vectors of related intra-prediction information can be created, called as most probable mode vectors (MPMV). For example, the elements in a MPMV can contain the following information and indexes

[Prediction Mode, PDPC Choice, NSST Choice]

The techniques described in the previous sections, for processing and coding MPMs can be extended for MPMVs, and for example, a single binary symbol can indicate if all the elements in a vector are equal to one entry in the MPMV list. Or, one binary symbol may indicate whether at least two of the elements are equal, and so on.

These extensions correspond to alternative binarizations of the vector information but are more general than those that are constrained to only code one type of information after another is completely coded, because it allows coding simultaneously partial information about all elements.

In the current JEM, the contexts for MPM index coding are separated into 3 groups, i.e. Planar and DC (non-angular set), a horizontal set (modes from the bottom-left-to-above-right diagonal direction to the diagonal mode inclusive), and a vertical set (from the diagonal mode to above-right-to-bottom-left diagonal direction). The context set may be refined based on the intra MPM mode direction and/or the current block shape, and/or number of MPM modes in the MPM candidate list.

For example, if the total number of intra prediction modes is higher than the 35 modes used in HEVC, for example 67 modes, then a context for a MPM index can be grouped in a way that the context model depends on the distance to the preferred intra prediction modes, for example vertical or horizontal directions, for example as shown in the next table.

| Intra prediction mode | 0, 1 | 2 to 5 | 6 to 12 | 13 to 21 | 22 to 28 | 29 to 34 |
|---|---|---|---|---|---|---|
| Context model index | 0 | 1 | 2 | 3 | 2 | 1 |
| Intra prediction mode | | 35 to 38 | 39 to 45 | 46 to 54 | 55 to 61 | 62 to 67 |
| Context model index | | 1 | 2 | 3 | 2 | 1 |

More generally, a context used to code an MPM index may be assigned according to the distance of the particular MPM mode (the mode with particular MPM index) from the default or preselected intra prediction modes, in other words how far is the current MPM mode from the default modes. Those default modes can be, for example, horizontal, vertical, diagonal or any other direction.

Figure 5:
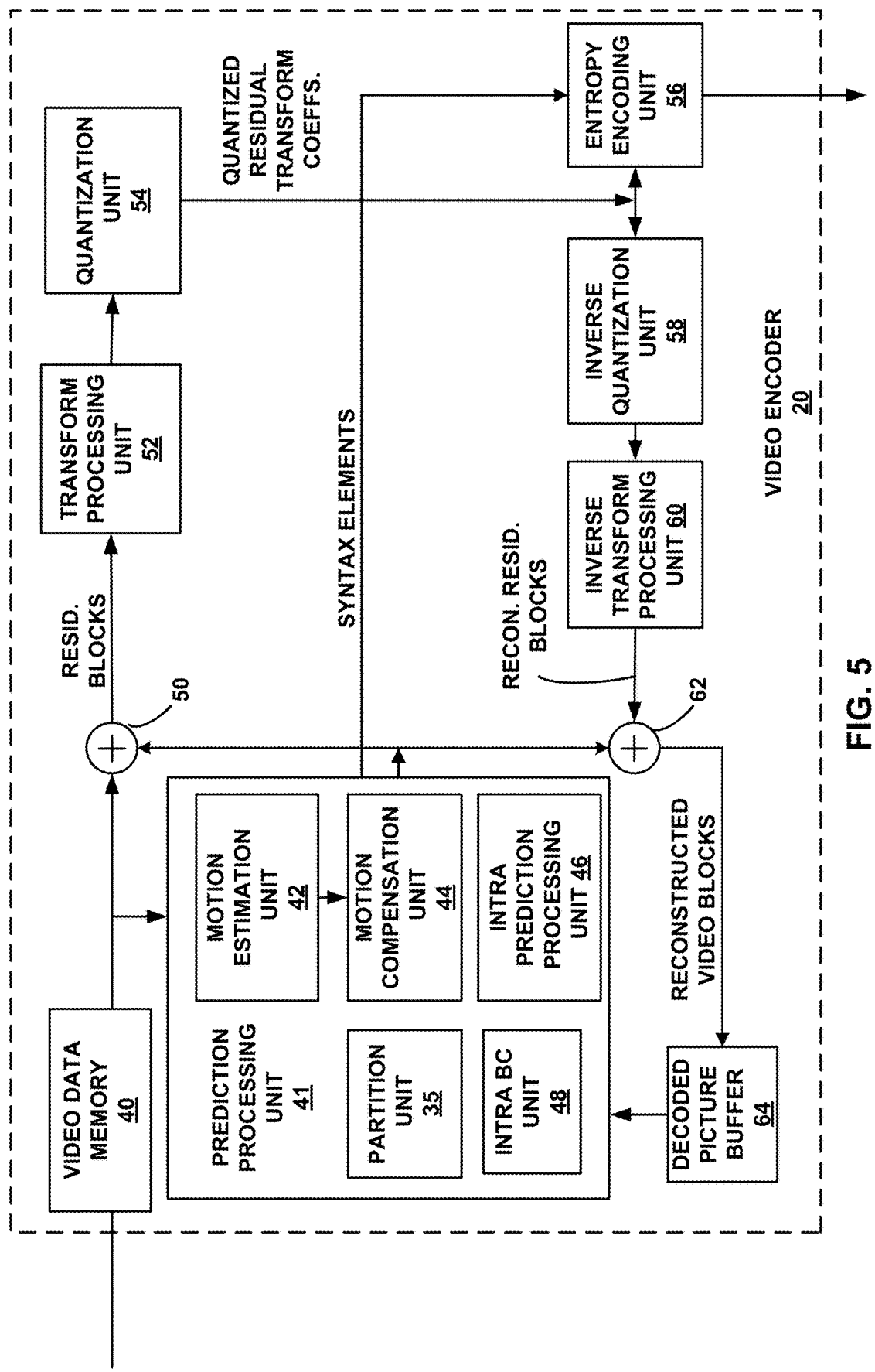
FIG. 5 is a block diagram illustrating an example video encoder that may implement the techniques described in this disclosure.

FIG. 5 is a block diagram illustrating an example video encoder 20 that may implement the techniques described in this disclosure. Video encoder 20 may perform intra and inter coding of video blocks within video slices. Intra coding relies on spatial prediction to reduce or remove spatial redundancy in video within a given video frame or picture. Inter coding relies on temporal prediction to reduce or remove temporal redundancy in video within adjacent frames or pictures of a video sequence. Intra prediction mode (I mode) may refer to any of several spatial based compression modes.

In the example of FIG. 5, video encoder 20 includes video data memory 40, prediction processing unit 41, decoded picture buffer (DPB) 64, summer 50, transform processing unit 52, quantization unit 54, and entropy encoding unit 56. Prediction processing unit 41 includes partition unit 35, motion estimation unit 42, motion compensation unit 44, intra BC unit 48, and intra prediction processing unit 46. For video block reconstruction, video encoder 20 also includes inverse quantization unit 58, inverse transform processing unit 60, and summer 62. An in-loop filter (not pictured) may be positioned between summer 62 and DPB 64.

In various examples, a fixed or programmable hardware unit of video encoder 20 may be tasked to perform the techniques of this disclosure. Also, in some examples, the techniques of this disclosure may be divided among one or more of the illustrated fixed or programmable hardware units of video encoder 20 shown in FIG. 5, though other devices may also perform the techniques of this disclosure.

Video data memory 40 may store video data to be encoded by the components of video encoder 20. The video data stored in video data memory 40 may be obtained, for example, from video source 18. DPB 64 is a buffer that stores reference video data for use in encoding video data by video encoder 20 (e.g., in intra or inter coding modes, also referred to as intra or inter prediction coding modes). Video data memory 40 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and DPB 64 may be provided by the same memory device or separate memory devices. In various examples, video data memory 40 may be on-chip with other components of video encoder 20, or off-chip relative to those components.

As shown in FIG. 5, video encoder 20 receives video data, and partition unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra or inter coded block to summer 50 to generate residual block data and to summer 62 to reconstruct the encoded block for use as a reference picture.

Intra prediction processing unit 46 within prediction processing unit 41 may perform intra predictive coding of the current video block relative to one or more neighboring blocks in the same frame or slice as the current block to be coded to provide spatial compression. Motion estimation unit 42 and motion compensation unit 44 within prediction processing unit 41 perform inter predictive coding of the current video block relative to one or more predictive blocks in one or more reference pictures to provide temporal compression.

Motion estimation unit 42 may be configured to determine the inter prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture. Intra BC unit 48 may determine vectors, e.g., block vectors, for Intra BC coding in a manner similar to the determination of motion vectors by motion estimation unit 42 for inter prediction, or may utilize motion estimation unit 42 to determine the block vector.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter coded slice by comparing the position of the PU to the position of a predictive block of a reference picture. The reference picture may be selected from a first reference picture list (List 0) or a second reference picture list (List 1), each of which identify one or more reference pictures stored in DPB 64. Motion estimation unit 42 sends the calculated motion vector to entropy encoding unit 56 and motion compensation unit 44.

In some examples, intra BC unit 48 may generate vectors and fetch predictive blocks in a manner similar to that described above with respect to motion estimation unit 42 and motion compensation unit 44, but with the predictive blocks being in the same picture or frame as the current block and with the vectors being referred to as block vectors as opposed to motion vectors. In other examples, intra BC unit 48 may use motion estimation unit 42 and motion compensation unit 44, in whole or in part, to perform such functions for Intra BC prediction according to the techniques described herein. In either case, for Intra BC, a predictive block may be a block that is found to closely match the block to be coded, in terms of pixel difference, which may be determined by sum of absolute difference (SAD), sum of squared difference (SSD), or other difference metrics, and identification of the block may include calculation of values for sub-integer pixel positions.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Whether the predictive video block is from the same picture according to Intra BC prediction, or a different picture according to inter prediction, video encoder 20 may form a residual video block by subtracting pixel values of the predictive block from the pixel values of the current video block being coded, forming pixel difference values. The pixel difference values form residual data for the block, and may include both luma component differences and chroma component differences. Summer 50 represents the component or components that perform this subtraction operation. Intra BC unit 48 and/or motion compensation unit 44 may also generate syntax elements associated with the video blocks and the video slice for use by a video decoder, such as video decoder 30, in decoding the video blocks of the video slice. The syntax elements may include, for example, syntax elements defining the vector used to identify the predictive block, any flags indicating the prediction mode, or any other syntax described with respect to the techniques of this disclosure.

Intra prediction processing unit 46 may intra-predict a current block, as an alternative to the inter-prediction performed by motion estimation unit 42 and motion compensation unit 44, or the Intra BC prediction performed by intra BC unit 48, as described above. In particular, intra prediction processing unit 46 may determine an intra prediction mode, including an Intra BC mode, to use to encode a current block. In some examples, intra prediction processing unit 46 may encode a current block using various intra prediction modes, e.g., during separate encoding passes, and intra prediction processing unit 46 (or a mode select unit, in some examples) may select an appropriate intra prediction mode to use from the tested modes. As part of determining an intra prediction mode, intra prediction processing unit 46 may construct an MPM candidate list according to the techniques of this disclosure. Intra prediction processing unit may select as the intra prediction mode for a particular block either an intra prediction mode in the MPM candidate list or a non-most probable mode not in the MPM candidate list.

Intra prediction processing unit 46 may, for example, calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra prediction mode exhibits the best rate-distortion value for the block.

In any case, after selecting an intra prediction mode for a block, intra prediction processing unit 46 may provide information indicative of the selected intra prediction mode for the block to entropy encoding unit 56. Entropy encoding unit 56 may encode the information indicating the selected intra prediction mode in accordance with the techniques of this disclosure. For blocks that are encoded using an intra prediction mode, entropy encoding unit 56 may, for example, select one or more contexts for encoding the information indicating if the actual intra prediction mode is a mode in the MPM candidate list.

After prediction processing unit 41 generates the predictive block for the current video block via either inter prediction or intra prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block for prediction of other video blocks. Motion compensation unit 44 and/or intra BC unit 48 may calculate a reference block by adding the residual block to a predictive block of one of the reference pictures within one of the reference picture lists. Motion compensation unit 44 and/or intra BC unit 48 may also apply one or more interpolation filters to the reconstructed residual block to calculate sub-integer pixel values for use in motion estimation.

Summer 62 adds the reconstructed residual block to the motion compensated prediction block produced by motion compensation unit 44 to produce a reference block for storage in DPB 64. The reference block may be used by intra BC unit 48, motion estimation unit 42 and motion compensation unit 44 as a reference block to inter predict a block in a subsequent video frame or picture.

Video encoder 20 represents an example of a device for encoding video data that is configured to determine a current block of video data is coded in an intra prediction mode, add an intra prediction mode of a first neighboring block to an MPM candidate list for the current block, add an intra prediction mode for a second neighboring block to the MPM candidate list, add an intra prediction mode for a third neighboring block to the most probable mode list, and generate information identifying an actual intra prediction mode used to encode the current block of video data. The first neighboring block, the second neighboring block, and the third neighboring block may each correspond to one of a left block, an above block, a below-left block, an above right block, or an above-left block.

Video encoder 20 may check a group of neighboring blocks in a fixed order to determine if neighboring blocks from the group of neighboring blocks were intra coded. Video encoder 20 may add intra prediction modes used to encode neighboring blocks from the group of neighboring blocks into the MPM candidate list in a fixed order. Video encoder 20 may check one or more neighboring blocks of a group of neighboring blocks to determine if the one or more neighboring blocks were intra coded. A maximum number of neighboring blocks in the group of neighboring blocks may be less than a maximum number of entries for the MPM candidate list. Video encoder 20 may add intra prediction modes used to encode the one or more neighboring blocks into the MPM candidate list.

Video encoder 20 may check one or more neighboring blocks of a group of neighboring blocks to determine if the one or more neighboring blocks were intra coded and, in response to two neighboring blocks from the group of neighboring blocks being coded using a same intra prediction mode, include only one instance of the same intra prediction mode in the MPM candidate list. to include only one instance of the same intra prediction mode in the MPM candidate list, video encoder 20 may not add a second instance of the same intra prediction mode to the MPM candidate list. To include only one instance of the same intra prediction mode in the MPM candidate list, video encoder 20 may remove an instance of the same intra prediction mode from the MPM candidate list.

Video encoder 20 may check one or more neighboring blocks of a group of neighboring blocks to identify intra prediction modes to add to the MPM candidate list. To check the one or more neighboring blocks of the group of neighboring blocks to identify intra prediction modes to add to the MPM candidate list, video encoder 20 may determine if the one or more neighboring blocks were coded using an intra prediction mode. When a neighboring block is coded using an intra prediction mode, video encoder 20 may add the intra prediction mode used to encode the neighboring block to the MPM candidate list.

Video encoder 20 may determine a number of neighboring blocks in the group of neighboring blocks based on one or more of a size of the current block, whether the current block is a square block or a rectangular block, whether the current block is a horizontal block or a vertical block, or a prediction mode used to encode a neighboring block of the group of neighboring blocks. Video encoder 20 may determine locations of neighboring blocks in the group of neighboring blocks based on one or more of a size of the current block size, whether the current block is a square block or a rectangular block, whether the current block is vertically oriented or horizontally oriented, a size of a neighbor block, whether a neighbor block is a square block or a rectangular block, or whether a neighbor block is vertically oriented or horizontally oriented. Video encoder 20 may determine an order for checking neighboring blocks in the group of neighboring blocks based on one or more of a size of the current block size, whether the current block is a square block or a rectangular block, whether the current block is vertically oriented or horizontally oriented, a size of a neighbor block, whether a neighbor block is a square block or a rectangular block, or whether a neighbor block is vertically oriented or horizontally oriented.

The group of neighboring blocks may be the same group of neighboring blocks used for one or both an AMVP mode or a merge mode. To check the one or more neighboring blocks of the group of neighboring blocks to identify intra prediction modes to add to the MPM candidate list, video encoder 20 may check the one or more neighboring blocks using a same order used to check neighboring blocks for one or both an AMVP mode or a merge mode.

In response to a number of intra prediction modes from the one or more neighboring blocks added to the MPM candidate list exceeding a threshold number, video encoder 20 may terminate the checking of the one more checking one or more neighboring blocks of a group of neighboring blocks. The threshold number may be less than a number of neighboring blocks in the group of neighboring blocks. The threshold number may be less than a maximum number of intra prediction modes included in the MPM candidate list.

Video encoder 20 may add one or more derived intra prediction modes to the MPM candidate list. Video encoder 20 may determine the one or more derived intra prediction mode based on an intra prediction mode of a neighboring block. To determine the one or more derived intra prediction modes based on the intra prediction mode of the neighboring block, video encoder 20 may add an intra prediction mode with a mode index of the intra prediction mode of the neighboring block plus an offset to the MPM candidate list.

To determine the one or more derived intra prediction mode based on the intra prediction mode of the neighboring block, video encoder 20 may add a first offset to the intra prediction mode of the first neighboring block to determine a first derived intra prediction mode, add a second offset to the intra prediction mode of the first neighboring block to determine a second derived intra prediction mode, and add the first derived intra prediction mode and the second derived intra prediction mode to the MPM candidate list. To determine the one or more derived intra prediction mode based on the intra prediction mode of the neighboring block, video encoder 20 may add a first offset to the intra prediction mode of the first neighboring block to determine a first derived intra prediction mode, add a second offset to the intra prediction mode of the second neighboring block to determine a second derived intra prediction mode, and add the first derived intra prediction mode and the second derived intra prediction mode to the MPM candidate list.

Video encoder 20 may determine the offset based on one or both of a characteristic of the current block or a characteristic of the neighboring block. To determine the one or more derived intra prediction mode based on the intra prediction mode of the neighboring block, video encoder 20 may add an intra prediction mode with a mode index 1 greater than a mode index of the intra prediction mode of the neighboring block to the MPM candidate list. To determine the one or more derived intra prediction mode based on the intra prediction mode of the neighboring block, video encoder 20 may add an intra prediction mode with a mode index 2 greater than a mode index of the intra prediction mode of the neighboring block to the MPM candidate list. To determine the one or more derived intra prediction mode based on the intra prediction mode of the neighboring block, video encoder 20 may add an intra prediction mode with a mode index 1 less than a mode index of the intra prediction mode of the neighboring block to the MPM candidate list. To determine the one or more derived intra prediction mode based on the intra prediction mode of the neighboring block, video encoder 20 may add an intra prediction mode with a mode index 2 less than a mode index of the intra prediction mode of the neighboring block to the MPM candidate list.

In response to two derived intra prediction modes being a same intra prediction mode, video encoder 20 may include only one instance of the derived intra prediction mode in the MPM candidate list. To include only one instance of the derived intra prediction mode in the MPM candidate list, video encoder 20 may not add a second instance of the derived intra prediction mode to the MPM candidate list. To include only one instance of the derived intra prediction mode in the MPM candidate list, video encoder 20 may remove an instance of the derived intra prediction mode from the MPM candidate list.

In response to a number of derived intra prediction modes added to the MPM candidate list exceeding a threshold number of derived intra prediction modes, video encoder 20 may terminate the adding of derived intra prediction modes. The threshold number of derived intra prediction modes plus a number of neighbor-based intra prediction modes included in the MPM candidate list may be less than a maximum number of intra prediction modes included in the MPM candidate list.

Video encoder 20 may add one or more default candidates to the MPM candidate list. Video encoder 20 may add one or more default candidates to the MPM candidate list in response to a number of available neighbor-based intra prediction modes and derived intra prediction modes being less than a maximum number of intra prediction modes included in the MPM candidate list. To add the one or more default candidates to the MPM candidate list, video encoder 20 may add one or more default candidates to the MPM candidate list until a number of intra prediction modes in the MPM candidate list is equal to a maximum number of intra prediction modes included in the MPM candidate list is reached.

Video encoder 20 may add one or more neighbor-based intra prediction modes to the MPM candidate list and, after adding all of the one or more neighbor-based intra prediction modes to the MPM candidate list, add one or more default intra prediction modes to the MPM candidate list. After adding all of the one or more neighbor-based intra prediction modes to the MPM candidate list, video encoder 20 may add one or more default intra prediction modes to the MPM candidate list.

Video encoder 20 may add the one or more neighbor-based intra prediction modes to the MPM candidate list and, after adding all of the one or more neighbor-based intra prediction modes to the MPM candidate list, adding one or more default intra prediction modes to the MPM candidate list. After adding all of the one or more neighbor-based intra prediction modes to the MPM candidate list, video encoder 20 may add one or more derived intra prediction modes to the MPM candidate list. After adding all of the one or more neighbor-based intra prediction modes to the MPM candidate list, video encoder 20 may add one or more default intra prediction modes to the MPM candidate list. After adding the intra prediction mode of the first neighboring block to the MPM candidate list for the current block, video encoder 20 may add a first derived candidate to the MPM candidate list, and after adding the first derived candidate to the MPM candidate list, video encoder 20 may add the intra prediction mode for the second neighboring block to the MPM candidate list.

In some instances, the actual intra prediction mode used to encode the current block of video data may be an intra prediction mode from the MPM candidate list. In some instances, the actual intra prediction mode used to encode the current block of video data may be a non-most probable mode.

The information identifying the actual intra prediction mode used to encode the current block of video data may be a context coded index value that identifies one of the intra prediction modes in the MPM candidate list, and video encoder 20 may encode the context coded index value using any technique described in this disclosure or any other technique.

Video encoder 20 also represents an example of a device for encoding video data that is configured to check three or more neighboring blocks of a group of neighboring blocks to identify intra prediction modes to add to an MPM candidate list for a current block and encode the current block using an intra prediction mode. Video encoder 20 may check the group of neighboring blocks in a fixed order to determine if neighboring blocks from the group of neighboring blocks were intra coded. Video encoder 20 may add intra prediction modes used to encode neighboring blocks from the group of neighboring blocks to the MPM candidate list in a fixed order. Video encoder 20 may check the three or more neighboring blocks of the group of neighboring blocks to determine if the three or more neighboring blocks were intra coded and add intra prediction modes used to encode the three or more neighboring blocks into the MPM candidate list. A maximum number of neighboring blocks in the group of neighboring blocks is less than a maximum number of entries for the MPM candidate list.

Video encoder 20 may check the three or more neighboring blocks of the group of neighboring blocks to determine if the three or more neighboring blocks were intra coded, and in response to two neighboring blocks from the group of neighboring blocks being coded using a same intra prediction mode, include only one instance of the same intra prediction mode in the MPM candidate list. To include only one instance of the same intra prediction mode in the MPM candidate list, video encoder 20 may not add a second instance of the same intra prediction mode to the MPM candidate list. To include only one instance of the same intra prediction mode in the MPM candidate list, video encoder 20 may remove an instance of the same intra prediction mode from the MPM candidate list.

To check the three or more neighboring blocks of the group of neighboring blocks to identify intra prediction modes to add to the MPM candidate list, video encoder 20 may determine if the three or more neighboring blocks were coded using an intra prediction mode. When a neighboring block is coded using an intra prediction mode, video encoder 20 may add the intra prediction mode used to encode the neighboring block to the MPM candidate list.

Video encoder 20 may determine a number of neighboring blocks in the group of neighboring blocks based on three or more of a size of the current block, whether the current block is a square block or a rectangular block, whether the current block is a horizontal block or a vertical block, or a prediction mode used to encode a neighboring block of the group of neighboring blocks. Video encoder 20 may determine locations of neighboring blocks in the group of neighboring blocks based on three or more of a size of the current block size, whether the current block is a square block or a rectangular block, whether the current block is vertically oriented or horizontally oriented, a size of a neighbor block, whether a neighbor block is a square block or a rectangular block, or whether a neighbor block is vertically oriented or horizontally oriented.

Video encoder 20 may determine an order for checking neighboring blocks in the group of neighboring blocks based on one or more of a size of the current block size, whether the current block is a square block or a rectangular block, whether the current block is vertically oriented or horizontally oriented, a size of a neighbor block, whether a neighbor block is a square block or a rectangular block, or whether a neighbor block is vertically oriented or horizontally oriented.

The group of neighboring blocks may correspond to the same group of neighboring blocks used for one or both an AMVP mode or a merge mode. To check the three or more neighboring blocks of the group of neighboring blocks to identify intra prediction modes to add to the MPM candidate list, video encoder 20 may check the three or more neighboring blocks using a same order used to check neighboring blocks for one or both an AMVP mode or a merge mode.

In response to a number of intra prediction modes from the three or more neighboring blocks added to the MPM candidate list exceeding a threshold number, video encoder 20 may terminate the checking of the one more checking three or more neighboring blocks of a group of neighboring blocks. The threshold number may be less than a number of neighboring blocks in the group of neighboring blocks. The threshold number may be less than a maximum number of intra prediction modes included in the MPM candidate list.

Video encoder 20 may add one or more derived intra prediction modes to the MPM candidate list. Video encoder 20 may determine the three or more derived intra prediction mode based on an intra prediction mode of a neighboring block. To determine the three or more derived intra prediction mode based on the intra prediction mode of the neighboring block, video encoder 20 may add an intra prediction mode with a mode index of the intra prediction mode of the neighboring block plus an offset to the MPM candidate list. Video encoder 20 may determine the offset based on one or both of a characteristic of the current block or a characteristic of the neighboring block.

To determine the three or more derived intra prediction mode based on the intra prediction mode of the neighboring block, video encoder 20 may add an intra prediction mode with a mode index 1 greater than a mode index of the intra prediction mode of the neighboring block to the MPM candidate list. To determine the three or more derived intra prediction mode based on the intra prediction mode of the neighboring block, video encoder 20 may add an intra prediction mode with a mode index 2 greater than a mode index of the intra prediction mode of the neighboring block to the MPM candidate list. To determine the three or more derived intra prediction mode based on the intra prediction mode of the neighboring block, video encoder 20 may add an intra prediction mode with a mode index 1 less than a mode index of the intra prediction mode of the neighboring block to the MPM candidate list. To determine the three or more derived intra prediction mode based on the intra prediction mode of the neighboring block, video encoder 20 may add an intra prediction mode with a mode index 2 less than a mode index of the intra prediction mode of the neighboring block to the MPM candidate list.

In response to two derived intra prediction modes being a same intra prediction mode, video encoder 20 may include only one instance of the derived intra prediction mode in the MPM candidate list. To include only one instance of the derived intra prediction mode in the MPM candidate list, video encoder 20 may not add a second instance of the derived intra prediction mode to the MPM candidate list. To include only one instance of the derived intra prediction mode in the MPM candidate list, video encoder 20 may remove an instance of the derived intra prediction mode from the MPM candidate list.

In response to a number of derived intra prediction modes added to the MPM candidate list exceeding a threshold number of derived intra prediction modes, video encoder 20 may terminate the adding of derived intra prediction modes. The threshold number of derived intra prediction modes plus a number of neighbor-based intra prediction modes included in the MPM candidate list may be less than a maximum number of intra prediction modes included in the MPM candidate list.

Video encoder 20 may add one or more default candidates to the MPM candidate list. Video encoder 20 may add one or more default candidates to the MPM candidate list in response to a number of available neighbor-based intra prediction modes and derived intra prediction modes being less than a maximum number of intra prediction modes included in the MPM candidate list. To add the one or more default candidates to the MPM candidate list, video encoder 20 may add one or more default candidates to the MPM candidate list until a number of intra prediction modes in the MPM candidate list is equal to a maximum number of intra prediction modes included in the MPM candidate list is reached.

Video encoder 20 may generate information identifying an actual intra prediction mode used to encode the current block of video data. The actual intra prediction mode used to encode the current block of video data may be a most probable mode or may be a non-most probable mode. If the actual intra prediction mode is a most probable mode, then the information identifying the actual intra prediction mode used to encode the current block of video data may include a context coded index value that identifies one of the intra prediction modes in the MPM candidate list, and video encoder 20 may encode the context coded index value using any technique described in this disclosure or using other techniques.

Video encoder 20 also represents an example of a device for encoding video data that is configured to generate an MPM candidate list for a current block, determine an actual intra prediction mode for encoding the current block, in response to the actual intra prediction mode being an intra prediction mode included in the most probable list, context encode an index value identifying the actual intra prediction mode included in the MPM candidate list. To context encode the index value identifying the actual intra prediction mode included in the MPM candidate list, video encoder 20 may determine an index value associated with the actual intra prediction mode, binarize the index value associated with the actual intra prediction mode to determine a binarized codeword, map the binarized index value to bins, and context encode each bin associated with the binarized codeword.

The binarized codeword may be one of a unary coded codeword, a truncated unary codeword, a fixed binary codeword, a Golomb coded codeword, an Exponential Golomb coded codeword, or a Rice coded codeword. Each bin of the binarized codeword may correspond to one of the most probable modes in the MPM candidate list.

Video encoder 20 may determine the context for each bin based on a classification of the most probable mode corresponding to each bin. For a first bin corresponding to a first most probable mode, video encoder 20 may determine a context for the first bin based on whether the first most probable mode is a horizontal mode, whether the first most probable mode is a vertical mode, whether the first most probable mode is a diagonal mode, or whether the first most probable mode is a non-angular mode. The context may be further used for decoding non-intra prediction-related syntax elements. The MPM candidate list for the current block may be determined using any technique described in this disclosure or other techniques.

Figure 6:
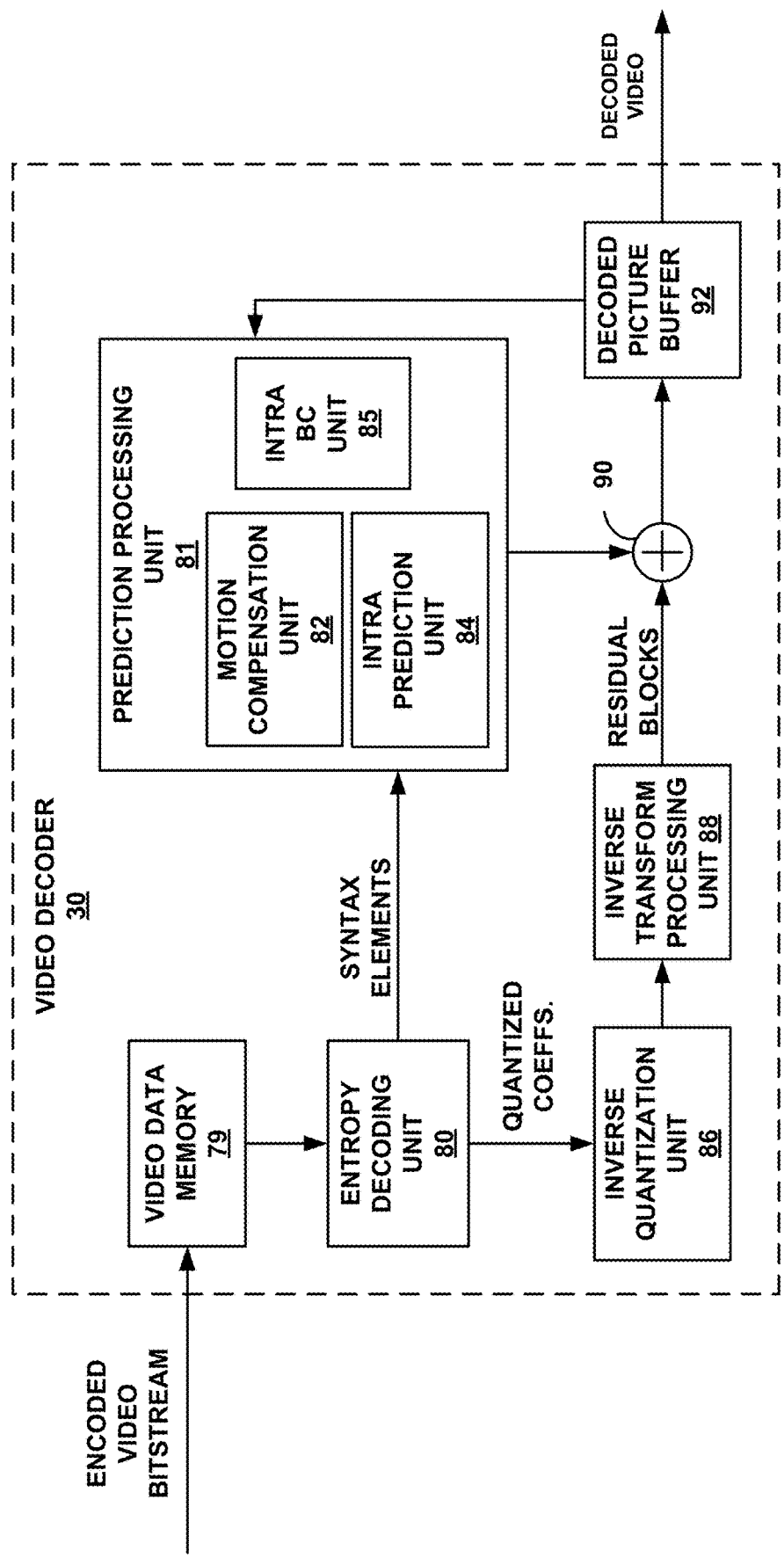
FIG. 6 is a block diagram illustrating an example video decoder that may implement the techniques described in this disclosure.

FIG. 6 is a block diagram illustrating an example video decoder 30 that may implement the techniques described in this disclosure. In the example of FIG. 6, video decoder 30 includes video data memory 79, entropy decoding unit 80, prediction processing unit 81, inverse quantization unit 86, inverse transform processing unit 88, summer 90, and DPB 92. Prediction processing unit 81 includes intra BC unit 85, motion compensation unit 82 and intra prediction processing unit 84. Video decoder 30 may, in some examples, perform a decoding pass generally reciprocal to the encoding pass described with respect to video encoder 20 from FIG. 5.

In various examples, a unit of video decoder 30 may be tasked to perform the techniques of this disclosure. Also, in some examples, the techniques of this disclosure may be divided among one or more of the units of video decoder 30. For example, intra BC unit 85 may perform the techniques of this disclosure, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the components of video decoder 30. The video data stored in video data memory 79 may be obtained, for example, from storage device 32, from a local video source, such as a camera, via wired or wireless network communication of video data, or by accessing physical data storage media. Video data memory 79 may form a coded picture buffer (CPB) that stores encoded video data from an encoded video bitstream. DPB 92 stores reference video data for use in decoding video data by video decoder 30 (e.g., in intra or inter coding modes, also referred to as intra or inter prediction coding modes). Video data memory 79 and DPB 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 79 and DPB 92 may be provided by the same memory device or separate memory devices. In various examples, video data memory 79 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra coded (I) slice or for intra coded blocks in other types of slices, intra prediction processing unit 84 of prediction processing unit 81 may generate prediction data for a video block of the current video slice based on a signaled intra prediction mode and data from previously decoded blocks of the current frame or picture. Intra prediction processing unit 84 may be configured to implement the techniques of this disclosure for performing intra prediction. More specifically, intra prediction processing unit 84 may be configured to generate an MPM candidate list according to the MPM candidate list construction techniques described herein. When the video frame is coded as an inter coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 92.

In other examples, when the video block is coded according to the Intra BC mode described herein, intra BC unit 85 of prediction processing unit 81 produces predictive blocks for the current video block based on block vectors and other syntax elements received from entropy decoding unit 80. The predictive blocks may be within a reconstructed region within the same picture as the current video block defined by video encoder 20, and retrieved from DPB 92.

Motion compensation unit 82 and/or intra BC unit 85 may determine prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra or inter prediction) used to code the video blocks of the video slice, an inter prediction slice type (e.g., B slice or P slice), construction information for one or more of the reference picture lists for the slice, motion vectors for each inter encoded video block of the slice, inter prediction status for each inter coded video block of the slice, and other information to decode the video blocks in the current video slice.

Similarly, intra BC unit 85 may use some of the received syntax elements, e.g., a flag, to determine that the current video block was predicted using the Intra BC mode, construction information indicating which video blocks of the picture are within the reconstructed region and should be stored in DPB 92, block vectors for each Intra BC predicted video block of the slice, Intra BC prediction status for each Intra BC predicted video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks. Video decoder 30 may be configured to decode blocks coded in merge mode and/or AMVP mode, in which case prediction processing unit 81 may be configured to assemble the same candidate lists assembled by video encoder 20. For example, prediction processing unit 81 may also perform the techniques described above with respect to FIGS. 6 and 7.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 or intra BC unit 85 generates the predictive block for the current video block based on the vectors and other syntax elements, video decoder 30 forms a decoded video block by summing the residual blocks from inverse transform processing unit 88 with the corresponding predictive blocks generated by motion compensation unit 82 and intra BC unit 85. Summer 90 represents the component or components that perform this summation operation to produce reconstructed video blocks.

Summer 90 represents the component or components that perform this summation operation. An in-loop filter (not pictured) may be positioned between summer 90 and DPB 92. The decoded video blocks in a given frame or picture are then stored in DPB 92, which stores reference pictures used for subsequent motion compensation. DPB 92, or a memory device separate from DPB 92, may also store decoded video for later presentation on a display device, such as display device 34 of FIG. 1.

Video decoder 30 represents an example of a device for decoding video data that is configured to determine a current block of video data is coded in an intra prediction mode; add an intra prediction mode of a first neighboring block to an MPM candidate list for the current block; add an intra prediction mode for a second neighboring block to the MPM candidate list; add an intra prediction mode for a third neighboring block to the most probable mode list; and decode the current block of video data using an intra prediction. The first neighboring block, the second neighboring block, and the third neighboring block may each correspond to one of a left block, an above block, a below block, an above right block, or an above left block.

Video decoder 30 may, for example, be configured to check a group of neighboring blocks in a fixed order to determine if neighboring blocks from the group of neighboring blocks were intra coded. Video decoder 30 may add intra prediction modes used to encode neighboring blocks from the group of neighboring blocks into the MPM candidate list in a fixed order. Video decoder 30 may check one or more neighboring blocks of a group of neighboring blocks to determine if the one or more neighboring blocks were intra coded and add intra prediction modes used to encode the one or more neighboring blocks into the MPM candidate list. A maximum number of neighboring blocks in the group of neighboring blocks may be less than a maximum number of entries for the MPM candidate list.

Video decoder 30 may, for example, check one or more neighboring blocks of a group of neighboring blocks to determine if the one or more neighboring blocks were intra coded, and in response to two neighboring blocks from the group of neighboring blocks being coded using a same intra prediction mode, include only one instance of the same intra prediction mode in the MPM candidate list. To include only one instance of the same intra prediction mode in the MPM candidate list, video decoder 30 may not add a second instance of the same intra prediction mode to the MPM candidate list, or to include only one instance of the same intra prediction mode in the MPM candidate list, video decoder 30 may remove an instance of the same intra prediction mode from the MPM candidate list.

Video decoder 30 may check one or more neighboring blocks of a group of neighboring blocks to identify intra prediction modes to add to the MPM candidate list. To check the one or more neighboring blocks of the group of neighboring blocks to identify intra prediction modes to add to the MPM candidate list, video decoder 30 may determine if the one or more neighboring blocks were coded using an intra prediction mode. When a neighboring block is coded using an intra prediction mode, video decoder 30 may add the intra prediction mode used to encode the neighboring block to the MPM candidate list.

To determine a number of neighboring blocks in the group of neighboring blocks, video decoder 30 may determine the number of neighboring blocks in the group of neighboring blocks based on one or more of a size of the current block, whether the current block is a square block or a rectangular block, whether the current block is a horizontal block or a vertical block, or a prediction mode used to encode a neighboring block of the group of neighboring blocks. Video decoder 30 may determine locations of neighboring blocks in the group of neighboring blocks based on one or more of a size of the current block size, whether the current block is a square block or a rectangular block, whether the current block is vertically oriented or horizontally oriented, a size of a neighbor block, whether a neighbor block is a square block or a rectangular block, or whether a neighbor block is vertically oriented or horizontally oriented. Video decoder 30 may determine an order for checking neighboring blocks in the group of neighboring blocks based on one or more of a size of the current block size, whether the current block is a square block or a rectangular block, whether the current block is vertically oriented or horizontally oriented, a size of a neighbor block, whether a neighbor block is a square block or a rectangular block, or whether a neighbor block is vertically oriented or horizontally oriented.

The group of neighboring blocks may correspond to the same group of neighboring blocks used for one or both an AMVP mode or a merge mode. To check the one or more neighboring blocks of the group of neighboring blocks to identify intra prediction modes to add to the MPM candidate list, video decoder 30 may check the one or more neighboring blocks using a same order used to check neighboring blocks for one or both an AMVP mode or a merge mode.

In response to a number of intra prediction modes from the one or more neighboring blocks added to the MPM candidate list exceeding a threshold number, video decoder 30 may terminate the checking of the one more checking one or more neighboring blocks of a group of neighboring blocks. The threshold number may, for example, be less than a number of neighboring blocks in the group of neighboring blocks. The threshold number may, for example, be less than a maximum number of intra prediction modes included in the MPM candidate list.

Video decoder 30 may add one or more derived intra prediction modes to the MPM candidate list. Video decoder 30 may determine the one or more derived intra prediction mode based on an intra prediction mode of a neighboring block. To determine the one or more derived intra prediction modes based on the intra prediction mode of the neighboring block, video decoder 30 may add an intra prediction mode with a mode index of the intra prediction mode of the neighboring block plus an offset to the MPM candidate list. To determine the one or more derived intra prediction mode based on the intra prediction mode of the neighboring block, video decoder 30 may add a first offset to the intra prediction mode of the first neighboring block to determine a first derived intra prediction mode, add a second offset to the intra prediction mode of the first neighboring block to determine a second derived intra prediction mode, and add the first derived intra prediction mode and the second derived intra prediction mode to the MPM candidate list. To determine the one or more derived intra prediction mode based on the intra prediction mode of the neighboring block, video decoder 30 may add a first offset to the intra prediction mode of the first neighboring block to determine a first derived intra prediction mode, add a second offset to the intra prediction mode of the second neighboring block to determine a second derived intra prediction mode, and add the first derived intra prediction mode and the second derived intra prediction mode to the MPM candidate list.

Video decoder 30 may determine the offset based on one or both of a characteristic of the current block or a characteristic of the neighboring block. To determine the one or more derived intra prediction mode based on the intra prediction mode of the neighboring block, video decoder 30 may add an intra prediction mode with a mode index 1 greater than a mode index of the intra prediction mode of the neighboring block to the MPM candidate list. To determine the one or more derived intra prediction mode based on the intra prediction mode of the neighboring block, video decoder 30 may add an intra prediction mode with a mode index 2 greater than a mode index of the intra prediction mode of the neighboring block to the MPM candidate list. To determine the one or more derived intra prediction mode based on the intra prediction mode of the neighboring block, video decoder 30 may add an intra prediction mode with a mode index 1 less than a mode index of the intra prediction mode of the neighboring block to the MPM candidate list. To determine the one or more derived intra prediction mode based on the intra prediction mode of the neighboring block, video decoder 30 may add an intra prediction mode with a mode index 2 less than a mode index of the intra prediction mode of the neighboring block to the MPM candidate list.

In response to two derived intra prediction modes being a same intra prediction mode, video decoder 30 may include only one instance of the derived intra prediction mode in the MPM candidate list. To include only one instance of the derived intra prediction mode in the MPM candidate list, video decoder 30 may not add a second instance of the derived intra prediction mode to the MPM candidate list. To include only one instance of the derived intra prediction mode in the MPM candidate list, video decoder 30 may remove an instance of the derived intra prediction mode from the MPM candidate list.

In response to a number of derived intra prediction modes added to the MPM candidate list exceeding a threshold number of derived intra prediction modes, video decoder 30 may terminate the adding of derived intra prediction modes. The threshold number of derived intra prediction modes plus a number of neighbor-based intra prediction modes included in the MPM candidate list may be less than a maximum number of intra prediction modes included in the MPM candidate list.

Video decoder 30 may add one or more default candidates to the MPM candidate list. Video decoder 30 may add one or more default candidates to the MPM candidate list in response to a number of available neighbor-based intra prediction modes and derived intra prediction modes being less than a maximum number of intra prediction modes included in the MPM candidate list. To add the one or more default candidates to the MPM candidate list, video decoder 30 may add one or more default candidates to the MPM candidate list until a number of intra prediction modes in the MPM candidate list is equal to a maximum number of intra prediction modes included in the MPM candidate list is reached.

Video decoder 30 may add one or more neighbor-based intra prediction modes to the MPM candidate list, and after adding all of the one or more neighbor-based intra prediction modes to the MPM candidate list, add one or more default intra prediction modes to the MPM candidate list. After adding all of the one or more neighbor-based intra prediction modes to the MPM candidate list, video decoder 30 may add one or more default intra prediction modes to the MPM candidate list.

Video decoder 30 may add the one or more neighbor-based intra prediction modes to the MPM candidate list, and after adding all of the one or more neighbor-based intra prediction modes to the MPM candidate list, add one or more default intra prediction modes to the MPM candidate list. After adding all of the one or more neighbor-based intra prediction modes to the MPM candidate list, video decoder 30 may add one or more derived intra prediction modes to the MPM candidate list. After adding all of the one or more neighbor-based intra prediction modes to the MPM candidate list, video decoder 30 may add one or more default intra prediction modes to the MPM candidate list.

After adding the intra prediction mode of the first neighboring block to the MPM candidate list for the current block, video decoder 30 may add a first derived candidate to the MPM candidate list and, after adding the first derived candidate to the MPM candidate list, add the intra prediction mode for the second neighboring block to the MPM candidate list.

In some instances, to decode the current block of video data using the intra prediction mode, video decoder 30 may use an intra prediction mode from the MPM candidate list. In other instances, to decode the current block of video data using the intra prediction mode, video decoder 30 may use an intra prediction mode that is a non-most probable mode. In some instances, video decoder 30 may receive a context coded index value that identifies one of the intra prediction modes in the MPM candidate list and decode the context coded index value using techniques described in this disclosure or other techniques.

Video decoder 30 also represents an example of a device for decoding video data that is configured to check three or more neighboring blocks of a group of neighboring blocks to identify intra prediction modes to add to an MPM candidate list for a current block and decode the current block using an intra prediction mode. Video decoder 30 may check the group of neighboring blocks in a fixed order to determine if neighboring blocks from the group of neighboring blocks were intra coded. Video decoder 30 may add intra prediction modes used to encode neighboring blocks from the group of neighboring blocks to the MPM candidate list in a fixed order.

Video decoder 30 may check the three or more neighboring blocks of the group of neighboring blocks to determine if the three or more neighboring blocks were intra coded. A maximum number of neighboring blocks in the group of neighboring blocks may be less than a maximum number of entries for the MPM candidate list. Video decoder 30 may add intra prediction modes used to encode the three or more neighboring blocks into the MPM candidate list.

Video decoder 30 may check the three or more neighboring blocks of the group of neighboring blocks to determine if the three or more neighboring blocks were intra coded, and in response to two neighboring blocks from the group of neighboring blocks being coded using a same intra prediction mode, include only one instance of the same intra prediction mode in the MPM candidate list. To include only one instance of the same intra prediction mode in the MPM candidate list, video decoder 30 may not add a second instance of the same intra prediction mode to the MPM candidate list. To include only one instance of the same intra prediction mode in the MPM candidate list, video decoder 30 may remove an instance of the same intra prediction mode from the MPM candidate list.

To check the three or more neighboring blocks of the group of neighboring blocks to identify intra prediction modes to add to the MPM candidate list, video decoder 30 may determine if the three or more neighboring blocks were coded using an intra prediction mode. When a neighboring block is coded using an intra prediction mode, video decoder 30 may add the intra prediction mode used to encode the neighboring block to the MPM candidate list.

Video decoder 30 may determine a number of neighboring blocks in the group of neighboring blocks based on three or more of a size of the current block, whether the current block is a square block or a rectangular block, whether the current block is a horizontal block or a vertical block, or a prediction mode used to encode a neighboring block of the group of neighboring blocks. Video decoder 30 may determine locations of neighboring blocks in the group of neighboring blocks based on three or more of a size of the current block size, whether the current block is a square block or a rectangular block, whether the current block is vertically oriented or horizontally oriented, a size of a neighbor block, whether a neighbor block is a square block or a rectangular block, or whether a neighbor block is vertically oriented or horizontally oriented. Video decoder 30 may determine an order for checking neighboring blocks in the group of neighboring blocks based on one or more of a size of the current block size, whether the current block is a square block or a rectangular block, whether the current block is vertically oriented or horizontally oriented, a size of a neighbor block, whether a neighbor block is a square block or a rectangular block, or whether a neighbor block is vertically oriented or horizontally oriented.

The group of neighboring blocks may be the same group of neighboring blocks used for one or both an AMVP mode or a merge mode. To check the three or more neighboring blocks of the group of neighboring blocks to identify intra prediction modes to add to the MPM candidate list, video decoder 30 may check the three or more neighboring blocks using a same order used to check neighboring blocks for one or both an AMVP mode or a merge mode.

In response to a number of intra prediction modes from the three or more neighboring blocks added to the MPM candidate list exceeding a threshold number, video decoder 30 may terminate the checking of the one more checking three or more neighboring blocks of a group of neighboring blocks. The threshold number may be less than a number of neighboring blocks in the group of neighboring blocks. The threshold number may be less than a maximum number of intra prediction modes included in the MPM candidate list.

Video decoder 30 may add one or more derived intra prediction modes to the MPM candidate list. Video decoder 30 may determine the three or more derived intra prediction mode based on an intra prediction mode of a neighboring block. To determine the three or more derived intra prediction mode based on the intra prediction mode of the neighboring block, video decoder 30 may add an intra prediction mode with a mode index of the intra prediction mode of the neighboring block plus an offset to the MPM candidate list. Video decoder 30 may determine the offset based on one or both of a characteristic of the current block or a characteristic of the neighboring block.

To determine the three or more derived intra prediction mode based on the intra prediction mode of the neighboring block, video decoder 30 may add an intra prediction mode with a mode index 1 greater than a mode index of the intra prediction mode of the neighboring block to the MPM candidate list. To determine the three or more derived intra prediction mode based on the intra prediction mode of the neighboring block, video decoder 30 may add an intra prediction mode with a mode index 2 greater than a mode index of the intra prediction mode of the neighboring block to the MPM candidate list. To determine the three or more derived intra prediction mode based on the intra prediction mode of the neighboring block, video decoder 30 may add an intra prediction mode with a mode index 1 less than a mode index of the intra prediction mode of the neighboring block to the MPM candidate list. To determine the three or more derived intra prediction mode based on the intra prediction mode of the neighboring block, video decoder 30 may add an intra prediction mode with a mode index 2 less than a mode index of the intra prediction mode of the neighboring block to the MPM candidate list.

In response to two derived intra prediction modes being a same intra prediction mode, video decoder 30 may include only one instance of the derived intra prediction mode in the MPM candidate list. To include only one instance of the derived intra prediction mode in the MPM candidate list, video decoder 30 may not add a second instance of the derived intra prediction mode to the MPM candidate list. To include only one instance of the derived intra prediction mode in the MPM candidate list, video decoder 30 may remove an instance of the derived intra prediction mode from the MPM candidate list.

In response to a number of derived intra prediction modes added to the MPM candidate list exceeding a threshold number of derived intra prediction modes, video decoder 30 may terminate the adding of derived intra prediction modes. The threshold number of derived intra prediction modes plus a number of neighbor-based intra prediction modes included in the MPM candidate list may be less than a maximum number of intra prediction modes included in the MPM candidate list.

Video decoder 30 may add one or more default candidates to the MPM candidate list. Video decoder 30 may add one or more default candidates to the MPM candidate list in response to a number of available neighbor-based intra prediction modes and derived intra prediction modes being less than a maximum number of intra prediction modes included in the MPM candidate list. To add the one or more default candidates to the MPM candidate list, video decoder 30 may add one or more default candidates to the MPM candidate list until a number of intra prediction modes in the MPM candidate list is equal to a maximum number of intra prediction modes included in the MPM candidate list is reached.

In some instances, to decode the current block of video data using the intra prediction mode, video decoder 30 may use an intra prediction mode that is a non-most probable mode. In some instances, video decoder 30 may receiving a context coded index value that identifies one of the intra prediction modes in the MPM candidate list and decoding the context coded index value using any technique described in this disclosure or a different technique.

Video decoder 30 also represents an example of a device for decoding video data that is configured to generate an MPM candidate list for a current block, receive a context coded index value identifying an intra prediction mode included in the MPM candidate list, determine a context for decoding the context coded index value, and context decode the context coded index value using the determined context to determine the intra prediction mode. The MPM candidate list may be constructed using any of the techniques described in this disclosure and/or using other techniques not described in this disclosure. Based on the determined context value, video decoder 30 may map the context coded index value to bins to determine a binarized codeword that includes the index value and corresponds to an intra prediction mode from the MPM candidate list.

The binarized codeword may be any of a unary coded codeword, a truncated unary codeword, a fixed binary codeword, a Golomb coded codeword, and Exponential Golomb coded codeword, or a Golomb-Rice coded codeword. Each bin of the binarized codeword may be context coded. Each bin of the binarized codeword may correspond to one of the most probable modes in the MPM candidate list.

Video decoder 30 may determine the context for each bin based on a classification of the most probable mode corresponding to each bin. For a first bin corresponding to a first most probable mode, video decoder 30 may determine a context for the first bin based on whether the first most probable mode is a horizontal mode, whether the first most probable mode is a vertical mode, whether the first most probable mode is a diagonal mode, or whether the first most probable mode is a non-angular mode. The context may be further used for decoding non-intra prediction-related syntax elements.

Figure 7A:
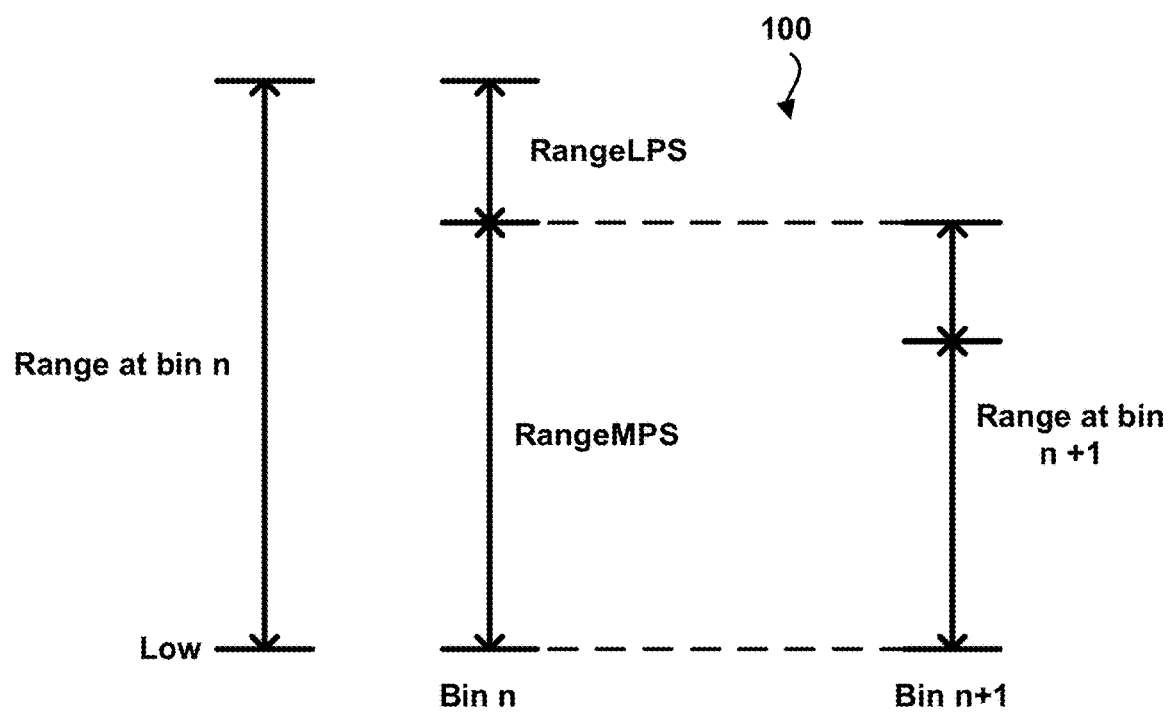
FIGS. 7A and 7B are conceptual diagrams illustrating a range update process in binary arithmetic coding.
Figure 7B:
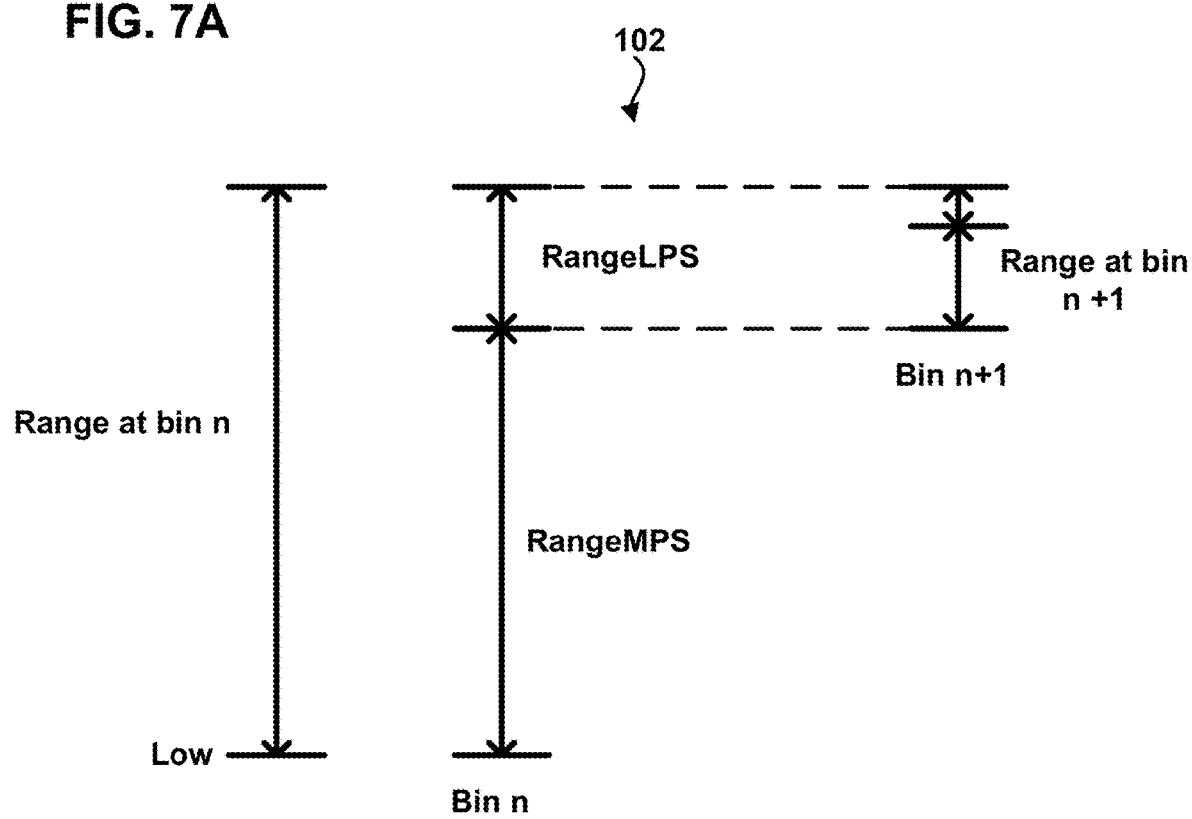

FIGS. 7A and 7B show examples of a CABAC process at a bin n. In example 100 of FIG. 7A, at bin n the range at bin 2 includes the RangeMPS and RangeLPS given by the probability of the LPS ($p_\sigma$) given a certain context state ($\sigma$). Example 100 shows the update of the range at bin n+1 when the value of bin n is equal to the MPS. In this example, the low stays the same, but the value of the range at bin n+1 is reduced to the value of RangeMPS at bin n. Example 102 of FIG. 7B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

In one example of the HEVC video coding process, range is expressed with 9 bits and the low with 10 bits. There is a renormalization process to maintain the range and low values at sufficient precision. The renormalization occurs whenever the range is less than 256. Therefore, the range is always equal or larger than 256 after renormalization. Depending on the values of range and low, the BAC outputs to the bitstream, a '0,' or a '1,' or updates an internal variable (called BO: bits-outstanding) to keep for future outputs.

Figure 8:
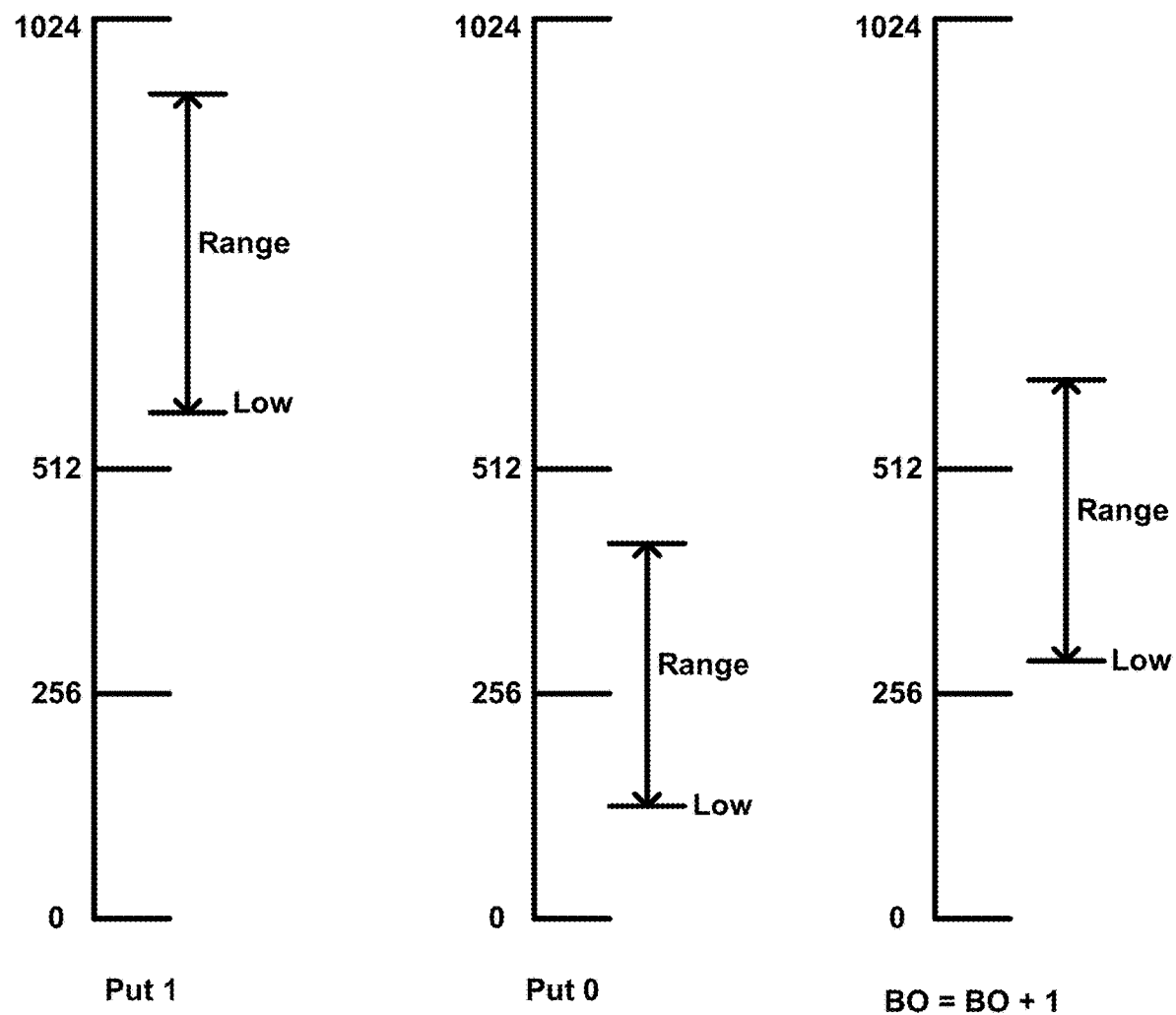
FIG. 8 is a conceptual diagram illustrating an output process in binary arithmetic coding.

FIG. 8 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

In the CABAC context model of H.264/AVC and in some examples of HEVC, there are 128 states. There are 64 possible LPS probabilities (denoted by state σ) that can be from 0 to 63. Each MPS can be zero or one. As such, the 128 states are 64 state probabilities times the 2 possible values for MPS (0 or 1). Therefore, the state can be indexed with 7 bits.

To reduce the computation of deriving LPS ranges (rangeLPS$_\sigma$), results for all cases are pre-calculated and stored as approximations in a look-up table in H.264/AVC and in some proposals for HEVC. Therefore, the LPS range can be obtained without any multiplication by using a simple table lookup. Avoiding multiplication can be important for some devices or applications, since this operation may cause significant latency in many hardware architectures.

A 4-column pre-calculated LPS range table may be used instead of the multiplication. The range is divided into four segments. The segment index can be derived by the question (range>>6)&3. In effect, the segment index is derived by shifting and dropping bits from the actual range. The following Table 1 shows the possible ranges and their corresponding indexes.

TABLE 1

| | Range Index | | | |
|---|---|---|---|---|
| Range | 256-319 | 320-383 | 384-447 | 448-511 |
| (rang>>6) & 3 | 0 | 1 | 2 | 3 |

The LPS range table has then 64 entries (one for each probability state) times 4 (one for each range index). Each entry is the Range LPS, that is, the value of multiplying the range times the LPS probability. An example of part of this table is shown in the following Table 2. Table 2 depicts probability states 9-12. In one proposal for HEVC, the probability states may range from 0-63.

TABLE 2

| | RangeLPS | | | |
|---|---|---|---|---|
| | | RangeLPS | | |
| Prob State (σ) | Index 0 | Index 1 | Index 2 | Index 3 |
| ... | ... | ... | ... | ... |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | ... | ... | ... | ... |

In each segment (i.e., range value), the LPS range of each probability state$_\sigma$ is pre-defined. In other words, the LPS range of a probability state$_\sigma$ is quantized into four values (i.e., one value for each range index). The specific LPS range used at a given point depends on which segment the range belongs to. The number of possible LPS ranges used in the table is a trade-off between the number of table columns (i.e., the number of possible LPS range values) and the LPS range precision. Generally speaking, more columns results in smaller quantization errors of LPS range values, but also increases the need for more memory to store the table. Fewer columns increases quantization errors, but also reduces the memory needed to store the table.

As described above, each LPS probability state has a corresponding probability. The probability for each state is derived as follows:

$$p_\sigma = \alpha p_{\sigma-1}$$

where the state σ is from 0 to 63. The constant α represents the amount of probability change between each context state. In one example, α=0.9493, or, more precisely, α=(0.01875/0.5)$^{1/63}$. The probability at state σ=0 is equal to 0.5 (i.e., $p_0$=½). That is, at context state 0, the LPS and MPS are equally probable. The probability at each successive state is derived by multiplying the previous state by α. As such, the probability of the LPS occurring at context state α=1 is $p_0$*0.9493 (0.5*0.9493=0.47465). As such, as the index of state α increases, the probability of the LPS occurring goes down.

CABAC is adaptive because the probability states are updated in order to follow the signal statistics (i.e., the values of previously coded bins). The update process is as follows. For a given probability state, the update depends on the state index and the value of the encoded symbol identified either as an LPS or an MPS. As a result of the updating process, a new probability state is derived, which consists of a potentially modified LPS probability estimate and, if necessary, a modified MPS value.

In the event of a bin value equaling the MPS, a given state index may be incremented by 1. This for all states except when an MPS occurs at state index 62, where the LPS probability is already at its minimum (or equivalently, the maximum MPS probability is reached). In this case, the state index 62 remains fixed until an LPS is seen, or the last bin value is encoded (state 63 is used for the special case of the last bin value). When an LPS occurs, the state index is changed by decrementing the state index by a certain amount, as shown in the equation below. This rule applies in general to each occurrence of a LPS with the following exception. Assuming a LPS has been encoded at the state with index σ=0, which corresponds to the equi-probable case, the state index remains fixed, but the MPS value will be toggled such that the value of the LPS and MPS will be interchanged. In all other cases, no matter which symbol has been encoded, the MPS value will not be altered. The derivation of the transition rules for the LPS probability is based on the following relation between a given LPS probability $p_{old}$ and its updated counterpart $p_{new}$:

$p_{new}$=max($\alpha p_{old}$, $p_{62}$) if a MPS occurs $p_{new}$=(1−α)+$\alpha p_{old}$ if a LPS occurs With regard to a practical implementation of the probability estimation process in CABAC, it is important to note that all transition rules may be realized by at most two tables each having 63 entries of 6-bit unsigned integer values. In some examples, state transitions may be determined with a single table TransIdxLPS, which determines, for a given state index σ, the new updated state index TransIdxLPS [σ] in case an LPS has been observed. The MPS-driven transitions can be obtained by a simple (saturated) increment of the state index by the fixed value of 1, resulting in an updated state index min(σ+1, 62). Table 3 below is an example of a partial TransIdxLPS table.

TABLE 3

TransIdxLPS

| Prob State (σ) | New State TransIdxLPS [σ] |
|---|---|
| ... | ... |
| 9 | 6 |
| 10 | 8 |
| 11 | 8 |
| 12 | 8 |
| ... | ... |

One problem with previous BAC approaches (e.g., the BAC approach used in H.264/AVC), is that the tables RangeLPS and TransIdxLPS are tuned for low resolution videos, (i.e., common intermediate format (CIF) and quarter-CIF (QCIF) videos). Currently, a large amount of video content is high definition (HD) and, in some cases, greater than HD. Video content that is HD or greater than HD resolution has different statistics than the 10-year-old QCIF sequences used to develop H.264/AVC.

As such, tables RangeLPS and TransIdxLPS from H.264/AVC may cause adaptation between states in a manner that is too quick. That is, the transitions between probability states, especially when an LPS occurs, can be too great for the smoother, higher resolution content of lHD video. Thus, the probability models used according to conventional techniques are not as accurate for HD and extra-HD content. In addition, as HD video content includes a greater range of pixel values, the H.264/AVC tables do not include enough entries to account for the more extreme values that may be present in HD content.

As such, there is a need for the RangeLPS and TransIdxLPS tables to be modified to account for the characteristics of this new content. This also implies that BAC should be different in at least two aspects. One difference is that BAC processes should use tables that allow for a slower adaptation process. Another difference is that BAC processes should account for more extreme cases (i.e., skewed probabilities).

The current RangeLPS and TransIdxLPS tables can be modified to achieve these goals by simply including more probability states and ranges. However, this solution incurs a substantial increase in the sizes of the tables. Slower adaptation may be achieved by using a parameter α closer to 1 than the currently used parameter α (e.g., α=0.9493). However, using a larger value of α causes the probabilities to tend to 0 more slowly, and as such, more states are needed. In addition, to achieve slower adaptation, it may be beneficial if the lowest possible probability is much lower than the currently used lowest probability. As such, even more states may be needed to reach that very low probability value.

In view of the foregoing problems, this disclosure proposes techniques to modify BAC so as to attain slower adaptation and more skewed probabilities while keeping the table sizes (e.g., the RangeLPS and TransIdxLPS tables) at a practical level. In other words, this disclosure describes techniques to achieve slower adaptation and more extreme probabilities (i.e., probabilities closer to 0 and 1) while using relatively small-sized tables.

The techniques described in this disclosure may use more probability states, e.g., more probability states than used in BAC with H.264/AVC or HEVC. In this case, the TransIdxLPS table can obtain slower adaptation and lower probabilities. In one example, the techniques described in this disclosure may use 128 probability states instead of 64.

This increases the table TransIdxLPS by 64 entries (i.e., 128 entries instead of 64). This increase allows for slower adaptation and lower minimal probability. As one example, by setting the parameter α=0.9689, the differences between contiguous probabilities become smaller. Additionally, the lowest minimum probability goes down to 0.009, which is around one half of the H.264/AVC case (i.e., 0.01875). Other numbers of states and α values are also possible, though, in general, the number of states may be increased and the value of α may be closer to 1 than the H.264/AVC case of α=0.9493.

Another parameter that might be modified to improve HD or extra-HD coding is the parameter $p_0$. The value of $p_0$ generally indicates the maximum probability for the LPS. The reason to consider this possibility is that having a lower $p_0$ means that the minimal probability also decreases. The value of $p_0$ is set to 0.5 in the conventional BAC process. This disclosure proposes to allow for other values for $p_0$. Having other values of $p_0$ lower than 0.5 allows for smoother transitions at state 0 when the MPS/LPS swap occurs. In one example, $p_0$ may be equal to 0.493, although many other examples could also be used.

Usually, each probability state has its own entry in the RangeLPS table. The table size may be represented as:

probability states×# quantized range indexes which is 64×4=256 bytes in some proposals for HEVC. Since the number of states would increase in examples of this disclosure (doubled in the example above), the RangeLPS table size may be 128×4=512 bytes. To avoid this increase in the RangeLPS table size, however, this disclosure further proposes to map the probability states indexes to a lower size (i.e., a few number of indexes) to index the RangeLPS size. In other words, this disclosure proposes to decouple the state transition process from the range computation process. This means, in the current example, that there is a map for the states to range computation. In one particular example, this disclosure proposes a process by which video encoder 20 and/or video decoder 30 is configured to map an index indicating the determined probability state to one of a plurality of grouped indexes (e.g., grouped index for a RangeLPS table), wherein at least one of the grouped indexes represents at least two of the plurality of probability states. As such, the RangeLPS table (or other BAC tables) may use fewer indexes than there are probability states.

In one example of the disclosure, the probability state number may be divided by two to generate a new index to use as an entry for the RangeLPS table. In this case, the 128 probability states are reduced to 64 entries. Consequently, the RangeLPS table can keep the current size as used in H.264/AVC. Therefore, instead of using the probability state σ to index the entry in the range LPS table, the techniques described in this disclosure employs (σ>>1), that is, the state σ is divided by two and rounded to the lower integer for use as a grouped index into the RangeLPS table. The division can be by a larger number if the RangeLPS table is desired to be smaller for a given implementation, or if the number of states is larger (e.g., 256 probability states). In this context, each grouped index represents two probability states. In other examples of the disclosure, the grouped indexes may represent two or more probability states.

From an optimal entropy point of view, the grouping of the states for the RangeLPS table by using the division or right bit-shift operation may be beneficial, but may not always be the optimal technique. The optimal grouping may depend on several factors, including the number of states and the parameter c, among others. The most desirable (and possibly optimal) grouping might not be a straightforward operation like the bit-shift operation. In general, the grouping can be described with a table, going from the total number of probability states to a reduced number of probability state (i.e., grouped states). In another example, this disclosure proposes to use this kind of table. This approach would enhance performance (compared to the division or right shifting), at the cost of additional memory. As such, this example is a trade-off between memory and performance, favoring better performance over the linear mapping example (i.e., the division or right shifting).

Hence, although a linear mapping of probability states to entries in the RangeLPS table may be used, it may be desirable to provide a nonlinear mapping. For example, the probability states may be mapped according to a logarithmic mapping. A logarithmic mapping may be achieved, in some examples, using piecewise linear mapping techniques. In general, such a mapping may be defined using a table, such as a precomputed mapping table.

In general, the techniques described in this disclosure may be performed, in some examples, by a method or device for entropy coding video data. The method may include determining a probability state of symbols in a binary arithmetic coding process, wherein the probability state comprises one of a plurality of probability states, and mapping an index indicating the determined probability state to one of a plurality of grouped indexes, wherein at least one of the grouped indexes represents at least two of the plurality of probability states, and wherein each of the grouped indexes points to a range for a lowest probability symbol in a table.

In some examples, the number of probability states may be greater than 64. For example, the number of probability states may be 128. In some examples, the number of grouped indexes used as an input into the RangeLPS table is 64. In particular, the number of probability states may be 128 and the number of grouped indexes used as an input into the RangeLPS table may be 64. A symbol may be coded based on the grouped indexes, e.g., according to a table based on the probability state index, or according to a mathematical operation based on the index. The determined probability state maps to one of a plurality of indexes according to a table, or according to a mathematical operation. The mapping may be linear or nonlinear. For example, the mapping may be performed according to a divide-by-two operation. In some examples, the mapping may be a logarithmic mapping. In some examples, a piecewise linear mapping may be used to define a logarithmic mapping. In some examples, the value $p_0$ of the maximum probability for the LPS may be less than 0.5.

The techniques described in this disclosure may be performed, for example, within a video encoder, video decoder, or combined video encoder-decoder (CODEC). In particular, such techniques may be performed in an entropy encoding unit of a video encoder and/or an entropy decoding unit of a video decoder. The techniques may be performed, for example, within a CABAC process, which may be configured to support video coding, such as video coding according to aspects of the HEVC standard Entropy encoding and decoding units may be apply coding processes in a reciprocal or inverse manner, e.g., to encode or decode any of a variety of video data, such as quantized transform coefficients associated with residual video data, motion vector information, syntax elements, and other types of information that may be useful in a video encoding and/or video decoding process.

Figure 9:
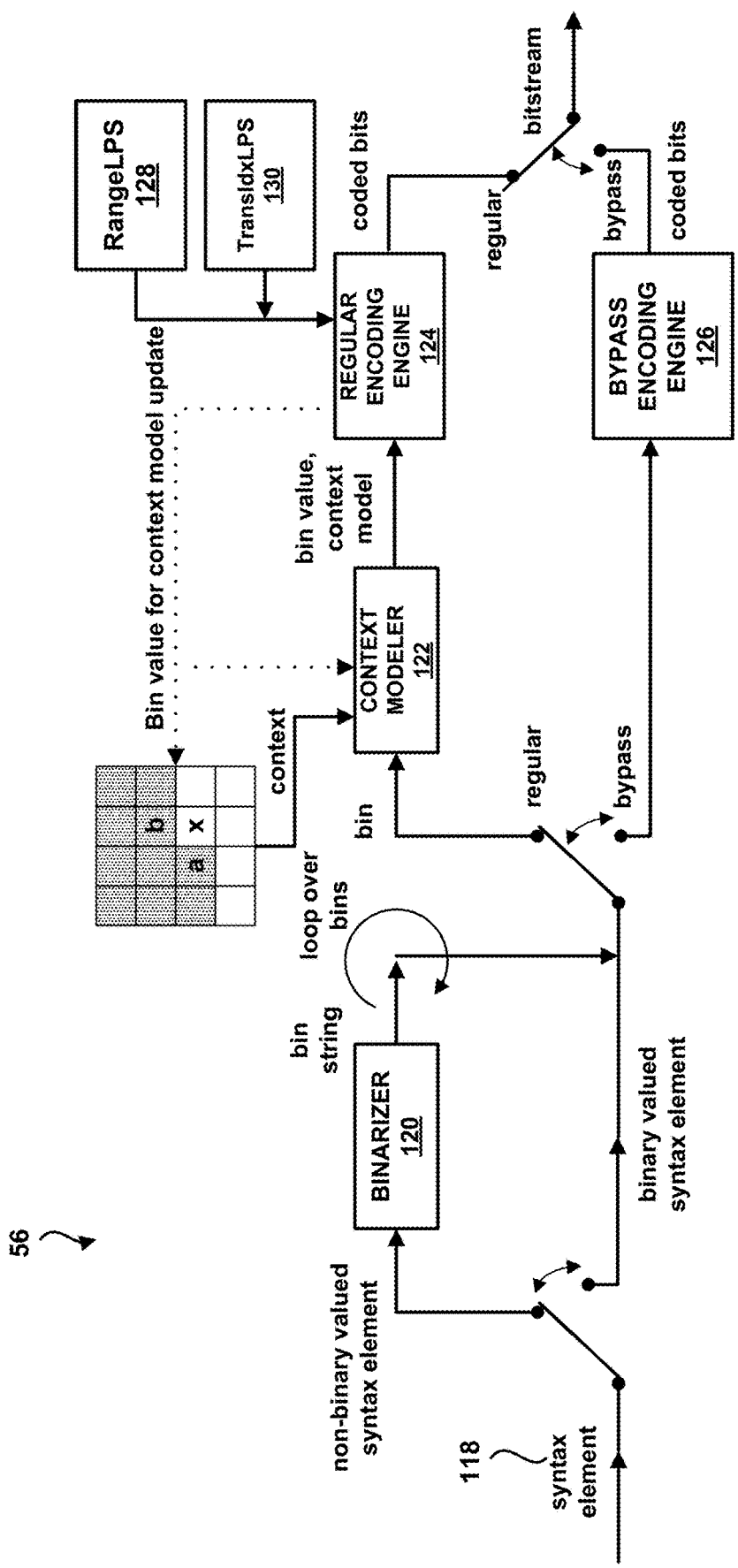
FIG. 9 is a block diagram illustrating a context adaptive binary arithmetic coder in a video encoder.

FIG. 9 is a block diagram of an example entropy encoding unit 56 that may be configured to perform CABAC in accordance with the techniques of this disclosure. A syntax element 118 is input into the entropy encoding unit 56. If the syntax element is already a binary-value syntax element (i.e., a syntax element that only has a value of 0 and 1), the step of binarization may be skipped. If the syntax element is a non-binary valued syntax element (e.g., a syntax element represented by multiple bits, such as transform coefficient levels), the non-binary valued syntax element is binarized by binarizer 120. Binarizer 120 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 120 is fed to the binary arithmetic coding side of entropy encoding unit 56. That is, for a predetermined set of non-binary valued syntax elements, each bin type (e.g., bin 0) is coded before the next bin type (e.g., bin 1). Coding may be performed in either regular mode or bypass mode. In bypass mode, bypass coding engine 126 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given then values of previously coded bins. The probability of a bin being an LPS is determined by context modeler 122. Context modeler 122 outputs the bin value and the context model (e.g., the probability state σ). The context model may be an initial context model for a series of bins, or may be determined based on the coded values of previously coded bins. As described above, the context modeler may update the state based on whether or not the previously-coded bin was an MPS or an LPS.

After the context model and probability state σ is determined by context modeler 122, regular coding engine 124 performs BAC on the bin value. According to the techniques of this disclosure, regular coding engine 124 performs BAC using TransIdxLPS table 130 that includes more than 64 probability states σ. In one example, the number of probability states is 128. TransIdxLPS is used to determine which probability state is used for a next bin (bin n+1) when the previous bin (bin n) is an LPS. Regular coding engine 124 may also use a RangeLPS table 128 to determine the range value for an LPS given a particular probability state σ. However, according to the techniques of this disclosure, rather than using all possible probability states σ of the TransIdxLPS table 130, the probability state indexes σ are mapped to grouped indexes for use in the RangeLPS table. That is, each index into the RangeLPS table 128 may represent two or more of the total number of probability states. The mapping of probability state index σ to grouped indexes may be linear (e.g., by dividing by two), or may be non-linear (e.g., a logarithmic function or mapping table).

In other examples of the disclosure, the difference between successive probability states may be made smaller by setting the parameter α to be greater than 0.9493. In one example α=0.9689. In another example of the disclosure, the highest probability (p$_0$) of an LPS occurring may be set to be lower than 0.5. In one example, p$_0$ may be equal to 0.493.

In accordance with one or more techniques of this disclosure, as opposed to using the same value of a variable used to update a probability state in a binary arithmetic coding process (e.g., one or more of a window size, a scaling factor (α), and a probability updating speed), entropy encoding unit 56 may use different values of the variable for different context models and/or different syntax elements. For instance, entropy encoding unit 56 may determine, for a context model of a plurality of context models, a value of a variable used to update a probability state in a binary arithmetic coding process, and update the probability state based on the determined value.

Returning to FIG. 4, in some cases, the entropy encoding unit 56 or another unit of video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients. In addition, entropy encoding unit 56, or other processing units, also may code other data, such as the values of a quantization matrix.

As discussed above, inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of DPB 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in DPB 64. The reconstructed video block may be used by motion estimation unit 42 and motion compensation unit 44 as a reference block to inter-code a block in a subsequent video frame.

Figure 10:
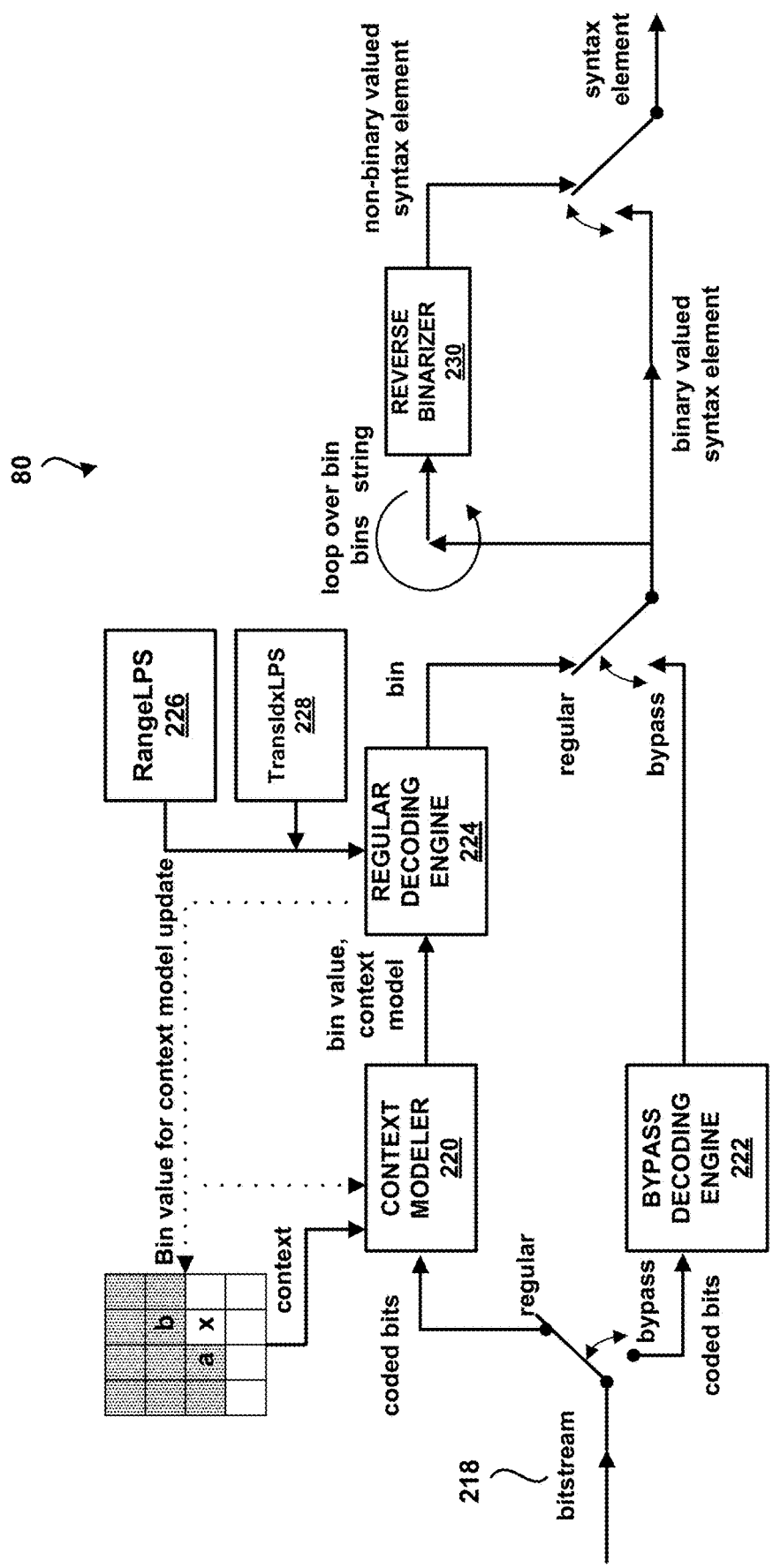
FIG. 10 is a block diagram illustrating a context adaptive binary arithmetic coder in a video decoder.

FIG. 10 is a block diagram of an example entropy decoding unit 80 that may be configured to perform CABAC in accordance with the techniques of this disclosure. The entropy decoding unit 80 of FIG. 10 performs CABAC in an inverse manner as that of entropy encoding unit 56 described in FIG. 5. Coded bits from bitstream 218 are input into entropy decoding unit 80. The coded bits are fed to either context modeler 220 or bypass coding engine 222 based on whether or not the coded bits were entropy coded using bypass mode or regular mode. If the coded bits were coded in bypass mode, bypass decoding engine will use Golomb-Rice or exponential Golomb decoding, for example, to retrieve the binary-valued syntax elements or bins of non-binary syntax elements.

If the coded bits were coded in regular mode, context modeler 220 may determine a probability model for the coded bits and regular decoding engine 224 may decode the coded bits to produce bins of non-binary valued syntax elements (or the syntax elements themselves if binary-valued). After the context model and probability state σ is determined by context modeler 220, regular decoding engine 224 performs BAC on the bin value. According to the techniques of this disclosure, regular decoding engine 224 performs BAC using TransIdxLPS table 228 that includes more than 64 probability states σ. In one example, the number of probability states is 128, although other numbers of probability states could be defined, consistent with the techniques of this disclosure. TransIdxLPS is used to determine which probability state is used for a next bin (bin n+1) when the previous bin (bin n) is an LPS. Regular decoding engine 224 may also use a RangeLPS table 226 to determine the range value for an LPS given a particular probability state σ. However, according to the techniques of this disclosure, rather than using all possible probability states σ of the TransIdxLPS table 228, the probability state indexes σ are mapped to grouped indexes for use in RangeLPS table 226. That is, each index into RangeLPS table 226 may represent two or more of the total number of probability states. The mapping of probability state index σ to grouped indexes may be linear (e.g., by dividing by two), or may be non-linear (e.g., a logarithmic function or mapping table).

In other examples of the disclosure, the difference between successive probability states may be made smaller by setting the parameter α to be greater than 0.9493. In one example α=0.9689. In another example of the disclosure, the highest probability ($p_O$) of an LPS occurring may be set to be lower than 0.5. In one example, $p_O$ may be equal to 0.493.

After the bins are decoded by regular decoding engine 224, a reverse binarizer 230 may perform a reverse mapping to convert the bins back into the values of the non-binary valued syntax elements.

Figure 11:
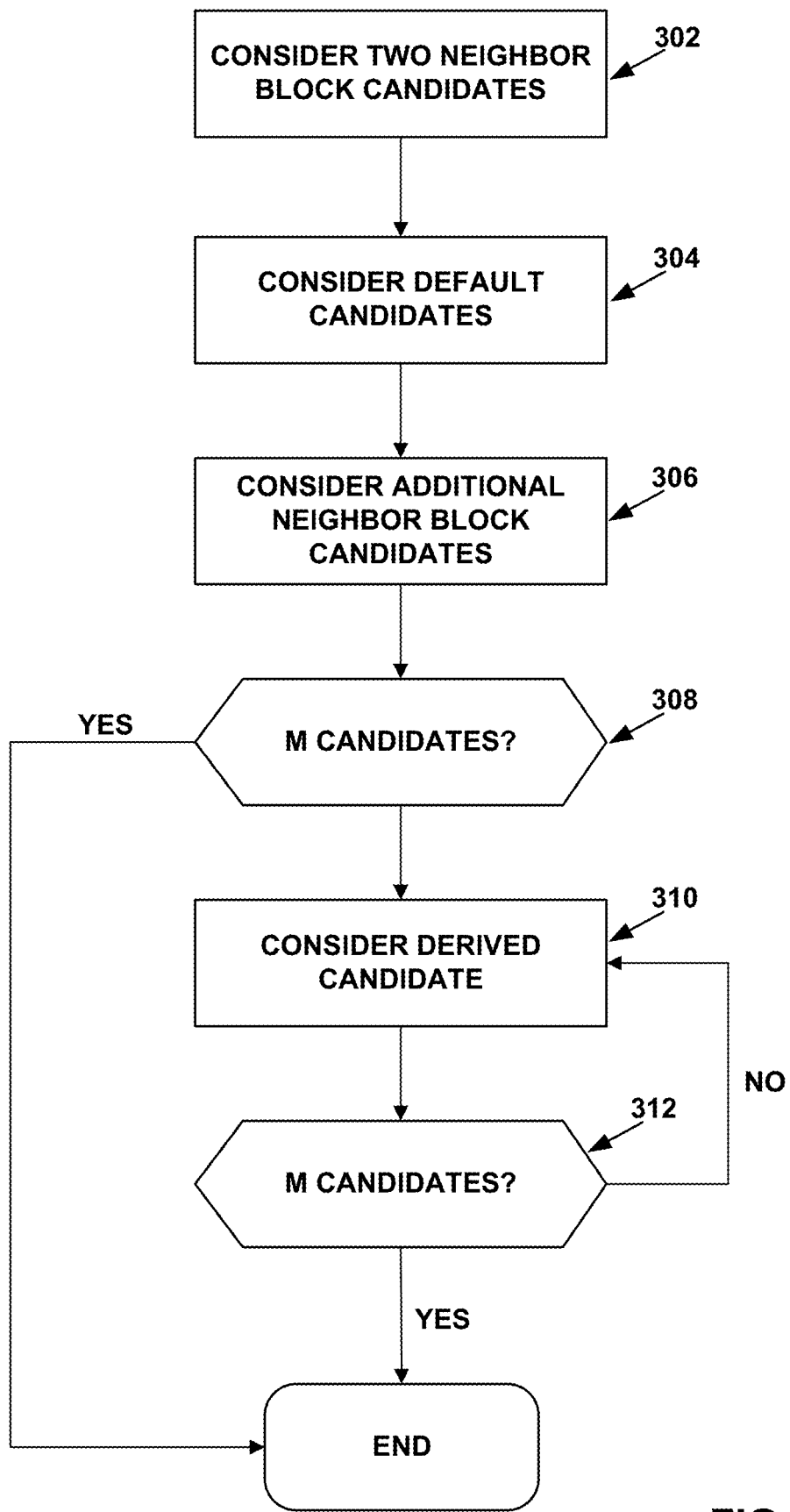
FIG. 11 is a flow diagram illustrating techniques for constructing a most probable mode candidate list according to the techniques of this disclosure.

FIG. 11 is a flow diagram illustrating techniques for constructing an MPM candidate list according to the techniques of this disclosure. The techniques of FIG. 11 may be performed by either video decoder 30 or video encoder 20 and will be described with reference to a generic video coder. After determining a current block of video data is coded using an intra prediction mode, the video coder constructs an MPM candidate list according to the techniques of FIG. 11. In the example of FIG. 11, the video coder considers two neighboring blocks (302). If the two neighboring blocks are coded using intra prediction modes, then the video coder adds an intra prediction mode of the first neighboring block to the MPM candidate list for the current block and adds an intra prediction mode for a second neighboring block to the MPM candidate list. If the first or second neighboring block is not coded using an intra prediction mode, then the neighboring block does not have an associated intra prediction mode for the video coder to add to the MPM candidate list. If the two neighboring blocks are coded using the same intra prediction mode, then the video coder may only add one instance of that intra prediction mode to the MPM candidate list.

After considering the intra prediction modes of the first neighboring block and the second neighboring block, the video coder considers one or more default candidates (304). The default candidates may, for example, include one or both of a planar mode and a DC mode. If a default mode is already included in the MPM candidate list, because for example the default mode was the intra prediction mode of the first or second neighboring block, then the video coder may not add another instance of that intra prediction mode to the MPM candidate list.

After considering the default intra prediction modes, the video coder considers one or more additional neighboring block candidates (306). If an additional neighboring block is coded using an intra prediction mode, then the video coder adds that intra prediction mode of the additional neighboring block to the MPM candidate list for the current block. If the additional neighboring block is not coded using an intra prediction mode, then the associated neighboring block does not have an associated intra prediction mode for the video coder to add to the MPM candidate list. If the additional neighboring candidate is coded using an intra prediction mode that is already included in the MPM candidate list, then the video coder may not add another instance of that intra prediction mode to the MPM candidate list.

If after considering all of the additional neighboring candidates the number of entries in the MPM candidate list is equal to a threshold number, M, (308, yes), then the video coder terminates the MPM candidate list construction process. If after considering all of the additional neighboring candidates the number of entries in the MPM candidate list is less than M (308, no), then the video coder considers a derived candidate (310). If after considering the derived candidate the number of entries in the MPM candidate list is equal to a threshold number, M, (312, yes), then the video coder terminates the MPM candidate list construction process. If after considering the derived candidate the number of entries in the MPM candidate list is less than M (312, no), then the video coder considers another derived candidate (310). The video coder considers derived candidates until the number of entries in the MPM candidate list is equal to M. In some instances, the video coder may also terminate the MPM candidate list construction process after considering all possible derived candidates, even if the number of entries in the MPM candidate list is less than M.

The video coder may determine the one or more derived intra prediction modes based on an intra prediction mode of a neighboring block. For example, to determine the one or more derived intra prediction modes based on the intra prediction mode of the neighboring block, the video coder may add an intra prediction mode with a mode index of the intra prediction mode of the neighboring block plus an offset to the MPM candidate list. The offset may, for example, be equal to one of −2, −1, 1, 2, or some other value.

When considering the neighbor block candidates, the video coder may consider the neighbor block candidates in a fixed order to determine if neighboring blocks from the group of neighboring blocks were intra coded and add intra prediction modes used to encode neighboring blocks from the group of neighboring blocks into the MPM candidate list in a fixed order. The video coder may, for example, check the one or more neighboring blocks using a same order used to check neighboring blocks for a merge mode.

Figure 12:
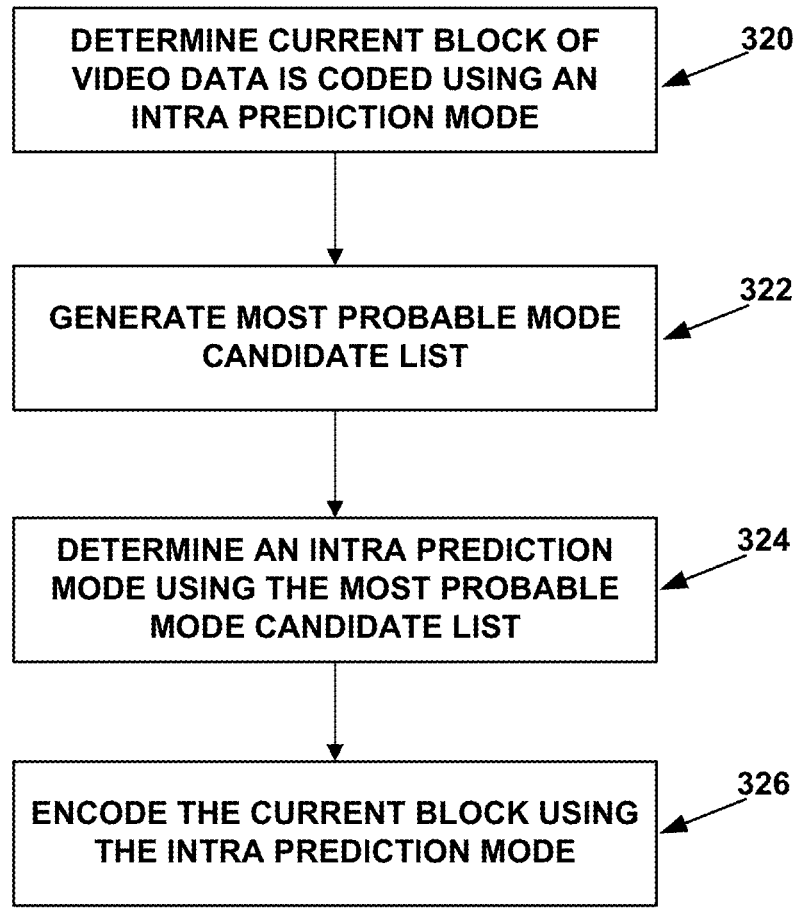
FIG. 12 is a flow diagram illustrating techniques for encoding a block of video data according to the techniques of this disclosure.

FIG. 12 is a flow diagram illustrating techniques for encoding a block of video data according to the techniques of this disclosure. The techniques of FIG. 12 will be described with respect to video encoder 20, although the techniques of FIG. 12 are not limited to any particular type of video encoder. In the example of FIG. 12, video encoder 20 determines a current block of video data is coded using an intra prediction mode (320). Video encoder 20 generates an MPM candidate list (322). Video encoder 20 may, for example, generate the MPM candidate list using the techniques described with respect to FIG. 11 or any other techniques described in this disclosure. Video encoder 20 determines a intra prediction mode using the MPM candidate list (324). Video encoder 20 encodes the current block of video data using the intra prediction mode (326). The intra prediction mode used to encode the current block may be a most probable mode (i.e., a mode included in the MPM candidate list) or may be a non-most probable mode (i.e., a mode not included in the MPM candidate list).

Figure 13:
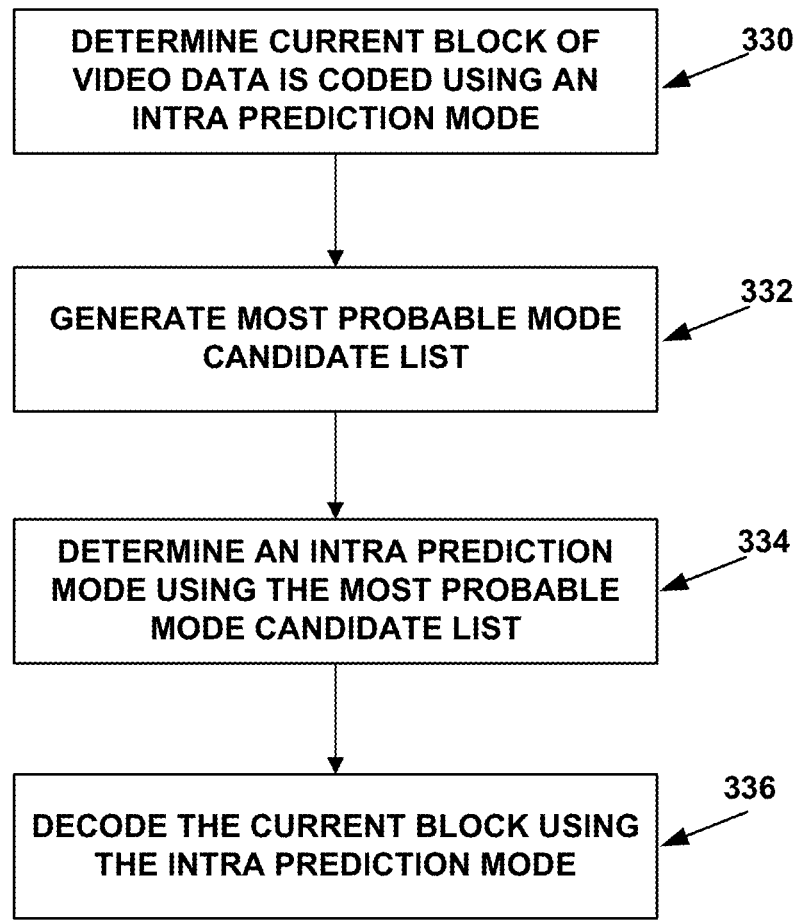
FIG. 13 is a flow diagram illustrating techniques for decoding a block of video data according to the techniques of this disclosure.

FIG. 13 is a flow diagram illustrating techniques for decoding a block of video data according to the techniques of this disclosure. The techniques of FIG. 13 will be described with respect to video decoder 30, although the techniques of FIG. 13 are not limited to any particular type of video decoder. In the example of FIG. 13, video decoder 30 determines a current block of video data is coded using an intra prediction mode (330). Video decoder 30 generates an MPM candidate list (332). Video decoder 30 may, for example, generate the MPM candidate list using the techniques described with respect to FIG. 11 or any other techniques described in this disclosure. Video decoder 30 determines an intra prediction mode using the MPM candidate list (334). Video decoder 30 decodes the current block of video data using an intra prediction mode (336). The intra prediction mode used to decode the current block may be a most probable mode (i.e., a mode included in the MPM candidate list) or may be a non-most probable mode (i.e., a mode not included in the MPM candidate list).

Video decoder 30 may, for example, determine the intra prediction mode using the MPM candidate list by determining if the intra prediction mode is one of the modes in the MPM candidate list or if the intra prediction mode is a mode not in the MPM candidate list. In some coding scenarios, to decode the current block of video data using the intra prediction mode, video decoder 30 may, for example, receive an indication that the intra prediction mode is not an intra prediction mode included in the MPM candidate list and receive additional syntax indicating the intra prediction mode. In some coding scenarios, to decode the current block of video data using the intra prediction mode, video decoder 30 may, for example, receive a context coded index value identifying an intra prediction mode included in the MPM candidate list, determine a context for decoding the context coded index value; and context decode the context coded index value using the determined context to determine the intra prediction mode. Based on the determined context value, video decoder 30 may map the context coded index value to bins to determine a binarized codeword comprising the index value, where the codeword corresponds to an intra prediction mode from the MPM candidate list. The binarized codeword may, for example, be a truncated unary codeword. In some examples, each bin of the binarized codeword is context coded. Each bin of the binarized codeword may correspond to one of the most probable modes in the MPM candidate list.

Video decoder 30 may determine the context for each bin based on a classification of the most probable mode corresponding to each bin. As one example, for a first bin corresponding to a first most probable mode, video decoder 30 may determine a context for the first bin based on whether the first most probable mode is a horizontal mode, whether the first most probable mode is a vertical mode, or whether the first most probable mode is a non-angular mode.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
　determining that a current block of video data is coded using an intra prediction mode;
　　adding an intra prediction mode of a first neighboring block of the current block to a most probable mode candidate list for the current block;
　　adding an intra prediction mode for a second neighboring block of the current block to the most probable mode candidate list for the current block, wherein the intra prediction mode of the first neighboring block of the current block is different than the intra prediction mode of the second neighboring block of the current block;

adding a first derived intra prediction mode to the most probable mode candidate list for the current block, wherein adding the first derived intra prediction mode to the most probable mode candidate list for the current block comprises:

determining whether the intra prediction mode of the first neighboring block belongs to a subset of modes that includes a planar mode and a DC mode, wherein the subset of modes includes fewer than all available intra prediction modes; and in response to determining that the intra prediction mode of the first neighboring block does not belong to the specified set of modes, adding a first offset to a mode index of the first neighboring block to derive the first derived intra prediction mode;

adding a second derived intra prediction mode to the most probable mode candidate list for the current block, wherein adding the second derived intra prediction mode to the most probable mode candidate list for the current block comprises determining the second derived intra prediction mode by adding a second offset to the mode index of the first neighboring block;

determining an intra prediction mode using the most probable mode candidate list; and decoding the current block of video data using the intra prediction mode.

2. The method of claim 1, wherein the first neighboring block and the second neighboring block are selected from a group including a left neighbor block, an above neighbor block, a below left neighbor block, an above right neighbor block, or an above left neighbor block relative to the current block.

3. The method of claim 1, further comprising:
after adding the intra prediction modes of the first neighboring block and the second neighboring block to the most probable mode candidate list, adding one or more default candidates to the most probable mode candidate list.

4. The method of claim 3, wherein the one or more default candidates comprise one or more of the DC mode, a horizontal mode, or a vertical mode.

5. The method of claim 1, wherein the first offset is equal to one of −2, −1, 1, or 2 and the second offset is equal to one of −2, −1, 1, or 2.

6. The method of claim 5, further comprising:
adding a plurality of derived intra prediction modes to the most probable mode candidate list, wherein the plurality of derived intra prediction modes includes the first derived intra prediction mode and the second derived intra prediction mode, and wherein adding the plurality of derived intra prediction modes to the most probable mode candidate list comprises:

adding derived intra prediction modes determined with offsets of −1 or 1 before adding derived intra prediction modes determined with offsets of −2 or 2.

7. The method of claim 1, further comprising:
in response to two derived intra prediction modes being a same intra prediction mode, including only one instance of the two derived intra prediction modes in the most probable mode candidate list.

8. The method of claim 1, wherein determining the intra prediction mode comprises:
receiving an indication that the intra prediction mode is not an intra prediction mode included in the most probable mode candidate list; and
receiving additional syntax indicating the intra prediction mode.

9. The method of claim 1, further comprising:
checking a group of neighboring blocks in a fixed order to determine if neighboring blocks from the group of neighboring blocks were intra coded, wherein the group of neighboring blocks comprises the first neighboring block, the second neighboring block, the third neighboring block, and at least one other neighboring block; and adding intra prediction modes used to encode neighboring blocks from the group of neighboring blocks into the most probable mode candidate list in the fixed order.

10. The method of claim 9, further comprising:
in response to two neighboring blocks from the group of neighboring blocks being coded using a same intra prediction mode, including only one instance of the same intra prediction mode in the most probable mode candidate list.

11. The method of claim 9, wherein checking the one or more neighboring blocks of the group of neighboring blocks comprises checking the one or more neighboring blocks using a same order used to check neighboring blocks for a merge mode.

12. The method of claim 9, further comprising:
in response to adding intra prediction modes used to encode neighboring blocks from the group of neighboring blocks into the most probable mode candidate list causing a number of intra prediction modes in the most probable mode candidate list to exceed a threshold number, terminating the checking of the one more checking one or more neighboring blocks of the group of neighboring blocks.

13. A device for decoding video data, the device comprising:
a memory configured to store the video data;
one or more processors implemented in circuitry and configured to:
determine that a current block of video data is coded using an intra prediction mode;
add an intra prediction mode of a first neighboring block of the current block to a most probable mode candidate list for the current block;
add an intra prediction mode for a second neighboring block of the current block to the most probable mode candidate list for the current block, wherein the intra prediction mode of the first neighboring block of the current block is different than the intra prediction mode of the second neighboring block of the current block;
add a first derived intra prediction mode to the most probable mode candidate list for the current block, wherein to add the first derived intra prediction mode to the most probable mode candidate list for the current block, the one or more processors are further configured to:
determine whether the intra prediction mode of the first neighboring block belongs to a subset of modes that includes a planar mode and a DC mode, wherein the subset of modes includes fewer than all available intra prediction modes; and in response to determining that the intra prediction mode of the first neighboring block does not belong to the specified set of modes, add a first offset to a mode index of the first neighboring block to derive the first derived intra prediction mode;

add a second derived intra prediction mode to the most probable mode candidate list for the current block, wherein to add the second derived intra prediction mode to the most probable mode candidate list for the current block, the one or more processors are further configured to determine the second derived intra prediction mode by adding a second offset to the mode index of the first neighboring block;

determine an intra prediction mode using the most probable mode candidate list; and decode the current block of video data using the intra prediction mode.

14. The device of claim 13, wherein the first neighboring block and the second neighboring block are selected from a group including a left neighbor block, an above neighbor block, a below left neighbor block, an above right neighbor block, or an above left neighbor block relative to the current block.

15. The device of claim 13, wherein the one or more processors are further configured to:
after adding the intra prediction modes of the first neighboring block and the second neighboring block to the most probable mode candidate list, add one or more default candidates to the most probable mode candidate list.

16. The device of claim 15, wherein the one or more defaults comprise one or more of the DC mode, a horizontal mode, or a vertical mode.

17. The device of claim 13, wherein the first offset is equal to one of −2, −1, 1, or 2 and the second offset is equal to one of −2, −1, 1, or 2.

18. The device of claim 17, wherein the one or more processors are further configured to:
add a plurality of derived intra prediction modes to the most probable mode candidate list, wherein the plurality of derived intra prediction modes includes the first derived intra prediction mode and the second derived intra prediction mode, and wherein adding the plurality of derived intra prediction modes to the most probable mode candidate list comprises:
add derived intra prediction modes determined with offsets of −1 or 1 before adding derived intra prediction modes determined with offsets of −2 or 2.

19. The device of claim 13, wherein the one or more processors are further configured to:
in response to two derived intra prediction modes being a same intra prediction mode, include only one instance of the two derived intra prediction modes in the most probable mode candidate list.

20. The device of claim 13, wherein to determine the intra prediction mode, the one or more processors are further configured to:
receive an indication that the intra prediction mode is not an intra prediction mode included in the most probable mode candidate list; and
receive additional syntax indicating the intra prediction mode.

21. The device of claim 13, wherein the one or more processors are further configured to:
check a group of neighboring blocks in a fixed order to determine if neighboring blocks from the group of neighboring blocks were intra coded, wherein the group of neighboring blocks comprises the first neighboring block, the second neighboring block, the third neighboring block, and at least one other neighboring block; and
add intra prediction modes used to encode neighboring blocks from the group of neighboring blocks into the most probable mode candidate list in the fixed order.

22. The device of claim 21, wherein the one or more processors are further configured to:
in response to two neighboring blocks from the group of neighboring blocks being coded using a same intra prediction mode, include only one instance of the same intra prediction mode in the most probable mode candidate list.

23. The device of claim 21, wherein to check the one or more neighboring blocks of the group of neighboring blocks, the one or more processors are further configured to check the one or more neighboring blocks using a same order used to check neighboring blocks for a merge mode.

24. The device of claim 21, wherein the one or more processors are further configured to:
in response to adding intra prediction modes used to encode neighboring blocks from the group of neighboring blocks into the most probable mode candidate list causing a number of intra prediction modes in the most probable mode candidate list to exceed a threshold number, terminate the checking of the one more checking one or more neighboring blocks of the group of neighboring blocks.

25. A computer-readable storage medium storing instructions that when executed by one or more processors cause the one or more processor to:
determine that a current block of video data is coded using an intra prediction mode;
add an intra prediction mode of a first neighboring block of the current block to a most probable mode candidate list for the current block;
add an intra prediction mode for a second neighboring block of the current block to the most probable mode candidate list for the current block, wherein the intra prediction mode of the first neighboring block of the current block is different than the intra prediction mode of the second neighboring block of the current block;
add a first derived intra prediction mode to the most probable mode candidate list for the current block, wherein to add the first derived intra prediction mode to the most probable mode candidate list for the current block, the instructions cause the one or more processors to:
determine whether the intra prediction mode of the first neighboring block belongs to a subset of modes that includes a planar mode and a DC mode, wherein the subset of modes includes fewer than all available intra prediction modes; and
in response to determining that the intra prediction mode of the first neighboring block does not belong to the specified set of modes, add a first offset to a mode index of the first neighboring block to derive the first derived intra prediction mode;
add a second derived intra prediction mode to the most probable mode candidate list for the current block, wherein to add the second derived intra prediction mode to the most probable mode candidate list for the current block, the one or more processors are further configured to determine the second derived intra prediction mode by adding a second offset to the mode index of the first neighboring block;

determine an intra prediction mode using the most probable mode candidate list; and decode the current block of video data using the intra prediction mode.

* * * * *